United States Patent
Choi et al.

(10) Patent No.: US 9,848,381 B2
(45) Date of Patent: Dec. 19, 2017

(54) CHANNEL ACCESS METHOD AND APPARATUS IN WIRELESS LAN SYSTEM

(71) Applicant: LG ELECTRONICS INC., Seoul (KR)

(72) Inventors: Jinsoo Choi, Anyang-si (KR); Hangyu Cho, Anyang-si (KR); Jeongki Kim, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 210 days.

(21) Appl. No.: 14/652,751

(22) PCT Filed: Dec. 17, 2013

(86) PCT No.: PCT/KR2013/011729
§ 371 (c)(1),
(2) Date: Jun. 16, 2015

(87) PCT Pub. No.: WO2014/098445
PCT Pub. Date: Jun. 26, 2014

(65) Prior Publication Data
US 2015/0334654 A1    Nov. 19, 2015

Related U.S. Application Data

(60) Provisional application No. 61/737,823, filed on Dec. 17, 2012.

(51) Int. Cl.
*G08C 17/00* (2006.01)
*H04H 20/71* (2008.01)
(Continued)

(52) U.S. Cl.
CPC ....... *H04W 52/0216* (2013.01); *H04W 4/005* (2013.01); *H04W 36/08* (2013.01);
(Continued)

(58) Field of Classification Search
CPC . H04W 52/0216; H04W 36/08; H04W 4/005; H04W 74/00; H04W 84/12; Y02B 60/50
See application file for complete search history.

(56) References Cited

U.S. PATENT DOCUMENTS

| 2013/0128798 A1* | 5/2013 | Liu | H04W 48/12 370/312 |
| 2014/0010223 A1* | 1/2014 | Wang | H04W 48/12 370/338 |
| 2014/0120962 A1* | 5/2014 | Merlin | H04W 68/02 455/466 |

FOREIGN PATENT DOCUMENTS

| KR | 10-2005-0024760 | 3/2005 |
| KR | 10-2009-0115479 | 11/2009 |

(Continued)

OTHER PUBLICATIONS

PCT International Application No. PCT/KR2013/011729, Written Opinion of the International Searching Authority dated Mar. 21, 2014, 18 pages.

*Primary Examiner* — Kiet Tang
(74) *Attorney, Agent, or Firm* — Lee Hong Degerman Kang Waimey

(57) ABSTRACT

The present invention relates to a method for converting, by a station (STA), a non-traffic indication map (TIM) mode into a TIM mode and performing channel-accessing. According to the present invention, a station that does not receive a TIM or DTIM is to be switched so as to operate between a wakeup mode and a sleep mode for power saving. In order to set an efficient wakeup time, the STA may listen to beacon frame information from an AP and access a channel through information included in the beacon frame information.

3 Claims, 16 Drawing Sheets

(51) Int. Cl.
*H04W 4/00* (2009.01)
*H04W 52/02* (2009.01)
*H04W 36/08* (2009.01)
*H04W 74/00* (2009.01)
*H04W 84/12* (2009.01)

(52) U.S. Cl.
CPC ............ *H04W 74/00* (2013.01); *H04W 84/12* (2013.01); *Y02B 60/50* (2013.01)

(56) References Cited

FOREIGN PATENT DOCUMENTS

| | | |
|---|---|---|
| KR | 10-1162818 | 7/2012 |
| WO | 2012/077908 | 6/2012 |
| WO | 2012/077952 | 6/2012 |

* cited by examiner

FIG. 6
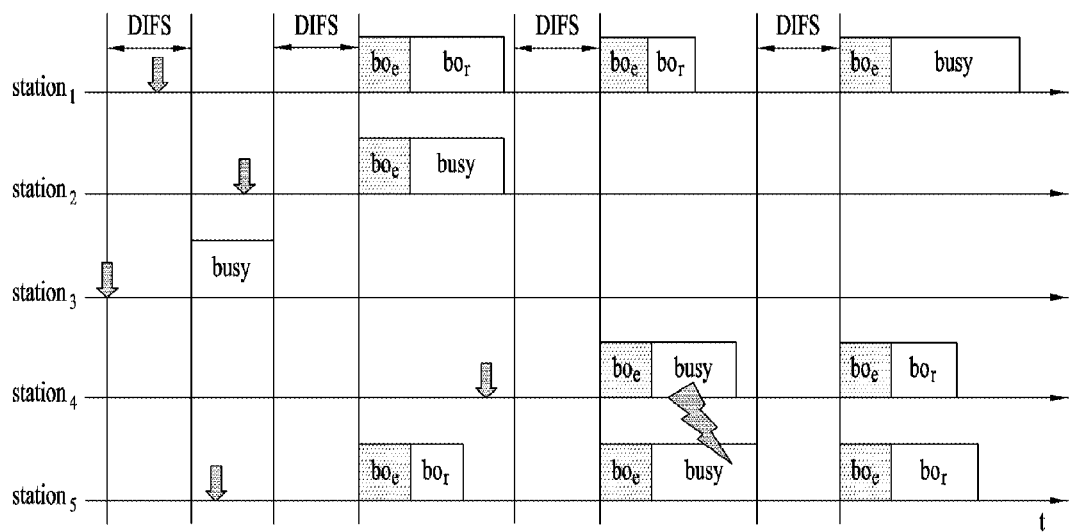
FIG. 7
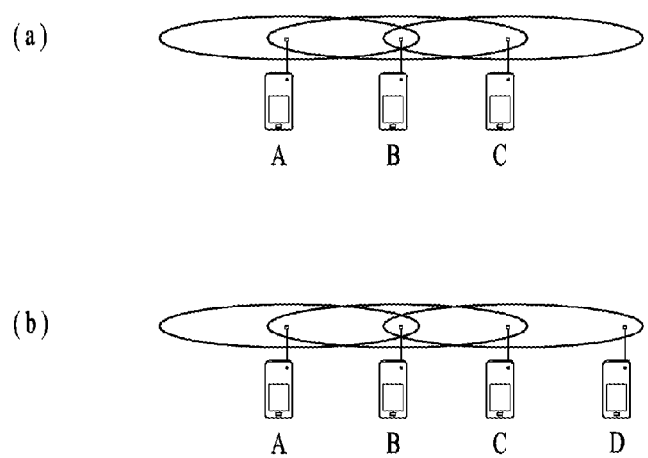

FIG. 14

| 1 octet | 1 octet | 2 bits | 5 bits | 5 bits | 4 bits | 0-4 octet |
|---|---|---|---|---|---|---|
| Element ID | Length | Page Index | Page Segment Count | Page Offset | reserved | Page Bitmap |

FIG. 15

| Element ID | Length | AID Request Mode | Wakeup Interval (optional) | Peer STA Address (optional) | Service Type (optional) |
|---|---|---|---|---|---|
| octet 1 | 1 | 1 | 2 | 6 | 1 |

FIG. 16

| Element ID | Length | AID | AID Switch Count | Wakeup Interval |
|---|---|---|---|---|
| octet 1 | 1 | 2 | 1 | 2 |

FIG. 17

| Category | Action | Dialog Token | AID Request IE |
|---|---|---|---|
| octet 1 | 1 | 1 | variable |

FIG. 18

| Category | Action | Dialog Token | AID Response IE |
|---|---|---|---|
| octet 1 | 1 | 1 | variable |

CHANNEL ACCESS METHOD AND APPARATUS IN WIRELESS LAN SYSTEM

CROSS-REFERENCE TO RELATED APPLICATIONS

This application is the National Stage filing under 35 U.S.C. 371 of International Application No. PCT/KR2013/011729, filed on Dec. 17, 2013, which claims the benefit of U.S. Provisional Application No. 61/737,823, filed on Dec. 17, 2012, the contents of which are all hereby incorporated by reference herein in their entirety.

TECHNICAL FIELD

The present disclosure relates to a wireless communication system and, more particularly, to a method and apparatus for establishing channel access to an access point by a station in a WLAN system.

BACKGROUND ART

With recent development of information communication technologies, a variety of wireless communication technologies have been developed. From among such technologies, WLAN is a technology that allows wireless Internet access at home, in businesses, or in specific service providing areas using a mobile terminal, such as a personal digital assistant (PDA), a laptop computer, and a portable multimedia player (PMP), based on radio frequency technology.

In order to overcome limited communication speed, which has been pointed out as a weak point of WLAN, technical standards have recently introduced a system capable of increasing the speed and reliability of a network while extending a coverage region of a wireless network. For example, IEEE 802.11n supports high throughput (HT) with a maximum data processing speed of 540 Mbps. In addition, Multiple Input Multiple Output (MIMO) technology, which employs multiple antennas for both a transmitter and a receiver in order to minimize transmission errors and optimize data rate, has been introduced.

DISCLOSURE

Technical Problem

Machine-to-machine (M2M) communication technology has been discussed as a next generation communication technology. A technical standard to support M2M communication in the IEEE 802.11 WLAN system is also under development as IEEE 802.11ah. In M2M communication, a scenario in which occasional transmission/reception of a small amount of data occurs at a low speed in an environment including a large number of devices may be assumed.

An object of the present invention devised to solve the problem lies in a method for performing channel access when the non-TIM mode is switched to the TIM mode.

Objects of the present invention are not limited to the aforementioned objects, and other objects of the present invention which are not mentioned above will become apparent to those having ordinary skill in the art upon examination of the following description.

Technical Solution

The object of the present invention can be achieved by providing a method for performing channel access to an access point (AP) by a station (STA) in a wireless local area network (WLAN), the method including transmitting mode switch request frame information to the AP, receiving response frame information for the mode switch request frame information from the AP and switching to a sleep state, switching from the sleep state to a wake-up state based on the received response frame information, and listening to beacon frame information containing a segmented traffic indication map (TIM), the STA belonging to the segmented TIM, wherein the response frame information includes next beacon information and information indicating a next target beacon transmission time (TBTT) of the STA.

Preferably, the beacon frame information may include buffered data status information, restricted access window (RAW) information and resource assignment information.

Preferably, the method may further include receiving the beacon frame information containing the segmented TIM and switching back to the sleep state.

Preferably, the next beacon information may include a page index value of a next segmented TIM transmitted for the next time, a current timestamp value and information indicating a duration extending up to a next beacon frame.

Preferably, the next TBTT includes information indicating a duration extending up to a next TBTT, a current timestamp value and page information of the STA, wherein the TBTT is a time between the segmented TIM and a next segmented TIM.

Preferably, the mode switch request frame is an association ID (AID) switch request frame, and the response frame is an AID switch response frame.

In another aspect of the present invention, provided herein is a method for performing channel access to an access point (AP) by a station (STA) in a wireless local area network (WLAN), the method including transmitting mode switch request frame information to the AP, receiving response frame information from the AP for the mode switch request frame information and switching to a sleep state, switching from the sleep state to a wake-up state based on the received response frame information, and listening to beacon frame information containing a next segmented traffic indication map (TIM), wherein the response frame information includes information created by reassigning association ID (AID) information and paging information.

Preferably, the response frame information may include a current timestamp value and information indicating a duration extending up to a next beacon frame.

In another aspect of the present invention, provided herein is a method for performing channel access to an access point (AP) by a station (STA) in a wireless local area network (WLAN) by switching from a non-traffic indication map (TIM) mode to a TIM mode between a time to listen to first delivery TIM (DTIM) beacon frame information and a time to listen to second DTIM beacon frame information, the method including transmitting mode switch request frame information to the AP, receiving response frame information for the mode switch request frame information from the AP and switching to a sleep state, switching from the sleep state to a wake-up state based on the received response frame information, and listening to the second DTIM beacon frame information, wherein, when a time for the STA to switch to the TIM mode is within a certain time before the time to listen to the second DTIM beacon frame information, the response frame information includes information indicating a duration extending up to the time to listen to the second DTIM beacon frame information.

Preferably, the response frame information may further include a current timestamp value.

Preferably, the DTIM beacon frame information may include at least one of segment count information element (IE) information indicating TIM segmentation information or paging information about the STA.

In another aspect of the present invention, provided herein is a method for performing channel access to an access point (AP) by a station (STA) in a wireless local area network (WLAN) by switching from a non-traffic indication map (TIM) mode to a TIM mode between a time to listen to first delivery TIM (DTIM) beacon frame information and a time to listen to second DTIM beacon frame information, the method including transmitting mode switch request frame information to the AP, receiving response frame information for the mode switch request frame information from the AP and switching to a sleep state, switching from the sleep state to a wake-up state based on the received response frame information, and listening to beacon frame information containing a segmented TIM, the STA belonging to the segmented TIM, wherein, when a time to switch to the TIM mode is within a certain time after the time to listen to the first DTIM beacon frame information, the response frame information includes segment count information element (IE) information indicating TIM segmentation information.

Advantageous Effects

According to one embodiment of the present invention, a method for performing channel access by a station switching from the non-TIM mode to the TIM mode is provided.

The effects that can be obtained from the present invention are not limited to the aforementioned effects, and other effects may be clearly understood by those skilled in the art from the descriptions given below.

DESCRIPTION OF DRAWINGS

The accompanying drawings, which are intended to provide a further understanding of the present invention, illustrate various embodiments of the present invention and together with the descriptions in this specification serve to explain the principle of the invention.

FIG. 6 illustrates a backoff process.

FIG. 7 illustrates a hidden node and an exposed node.

FIG. 14 is a diagram illustrating a segment count IE.

FIG. 15 is a diagram illustrating an AID request frame.

FIG. 16 is a diagram illustrating an AID response frame.

FIG. 17 is a diagram illustrating an AID switch request frame.

FIG. 18 is a diagram illustrating an AID switch response frame.

BEST MODE

Figure 1:
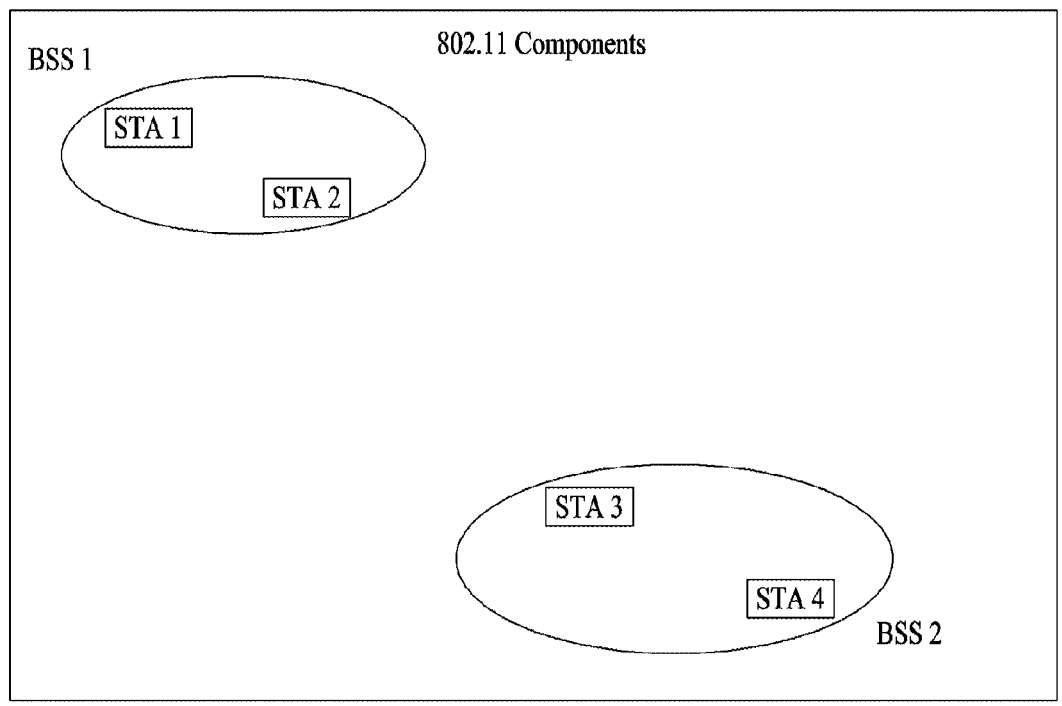
FIG. 1 is a diagram showing an exemplary structure of an IEEE 802.11 system to which the present invention is applicable.

Hereinafter, exemplary embodiments of the present invention will be described with reference to the accompanying drawings. The detailed description, which will be disclosed along with the accompanying drawings, is intended to describe exemplary embodiments of the present invention and is not intended to describe a unique embodiment through which the present invention can be carried out. The following detailed description includes specific details in order to provide a thorough understanding of the present invention. However, it will be apparent to those skilled in the art that the present invention may be practiced without such specific details.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions or features of any one embodiment may be included in another embodiment and may be replaced with corresponding constructions or features of another embodiment.

Specific terms used in the following description are provided to aid in understanding of the present invention. These specific terms may be replaced with other terms within the scope and spirit of the present invention.

In some instances, well-known structures and devices are omitted in order to avoid obscuring the concepts of the present invention and the important functions of the structures and devices are shown in block diagram form. The same reference numbers will be used throughout the drawings to refer to the same or like parts.

The embodiments of the present invention can be supported by standard documents disclosed for at least one of wireless access systems such as the institute of electrical and electronics engineers (IEEE) 802, 3rd generation partnership project (3GPP), 3GPP long term evolution (3GPP LTE), LTE-advanced (LTE-A), and 3GPP2 systems. For steps or parts of which description is omitted to clarify the technical features of the present invention, reference may be made to these documents. Further, all terms as set forth herein can be explained by the standard documents.

The following technology can be used in various wireless access systems such as systems for code division multiple access (CDMA), frequency division multiple access (FDMA), time division multiple access (TDMA), orthogonal frequency division multiple access (OFDMA), single carrier frequency division multiple access (SC-FDMA), etc. CDMA may be implemented by radio technology such as universal terrestrial radio access (UTRA) or CDMA2000. TDMA may be implemented by radio technology such as global system for mobile communications (GSM)/general packet radio service (GPRS)/enhanced data rates for GSM evolution (EDGE). OFDMA may be implemented by radio technology such as IEEE 802.11 (Wi-Fi), IEEE 802.16 (WiMAX), IEEE 802.20, evolved-UTRA (E-UTRA), etc. For clarity, the present disclosure focuses on 3GPP LTE and LTE-A systems. However, the technical features of the present invention are not limited thereto.

Structure of WLAN System

FIG. 1 is a diagram showing an exemplary structure of an IEEE 802.11 system to which the present invention is applicable.

The structure of the IEEE 802.11 system may include a plurality of components. A WLAN which supports transparent station (STA) mobility for a higher layer may be provided by mutual operations of the components. A basic service set (BSS) may correspond to a basic building block in an IEEE 802.11 LAN. In FIG. 1, two BSSs (BSS1 and BSS2) are present and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in a corresponding BSS maintain communication. This area may be referred to as a basic service area (BSA). If an STA moves out of the BSA, the STA cannot directly communicate with the other STAs in the corresponding BSA.

In the IEEE 802.11 LAN, the most basic type of BSS is an independent BSS (IBSS). For example, the IBSS may have a minimum form consisting of only two STAs. The BSS (BSS1 or BSS2) of FIG. 1, which is the simplest form and does not include other components except for the STAs, may correspond to a typical example of the IBSS. This configuration is possible when STAs can directly communicate with each other. Such a type of LAN may be configured as necessary instead of being prescheduled and is also called an ad-hoc network.

Memberships of an STA in the BSS may be dynamically changed when the STA becomes an on or off state or the STA enters or leaves a region of the BSS. To become a member of the BSS, the STA may use a synchronization process to join the BSS. To access all services of a BSS infrastructure, the STA should be associated with the BSS. Such association may be dynamically configured and may include use of a distributed system service (DSS).

Figure 2:
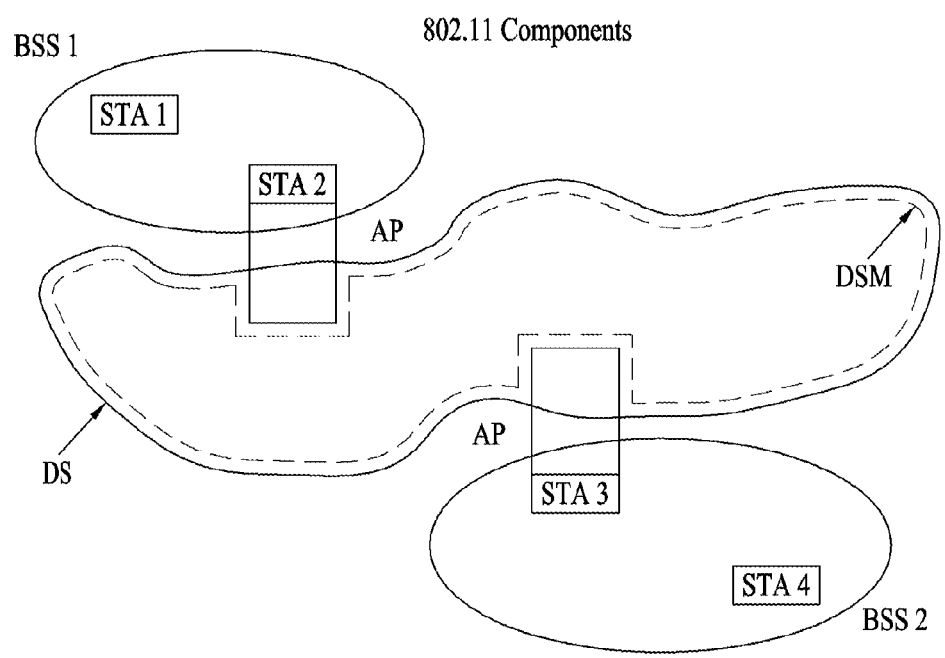
FIG. 2 is a diagram showing another exemplary structure of an IEEE 802.11 system to which the present invention is applicable.

FIG. 2 is a diagram showing another exemplary structure of an IEEE 802.11 system to which the present invention is applicable. In FIG. 2, components such as a distribution system (DS), a distribution system medium (DSM), and an access point (AP) are added to the structure of FIG. 1.

A direct STA-to-STA distance in a LAN may be restricted by physical (PHY) performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a wireless medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data can be moved between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not necessarily be identical to an address used by the AP for communication on the DSM.

Data transmitted from one of STAs associated with the AP to an STA address of the AP may be always received by an uncontrolled port and may be processed by an IEEE 802.1X port access entity. If the controlled port is authenticated, transmission data (or frame) may be transmitted to the DS.

Figure 3:
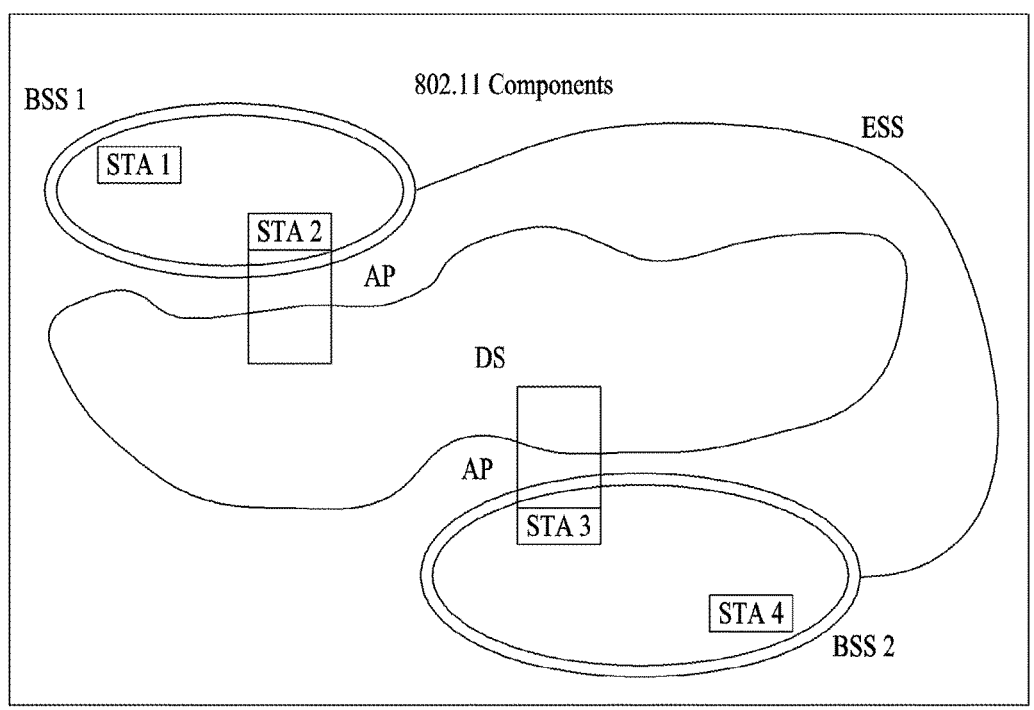
FIG. 3 is a diagram showing still another exemplary structure of an IEEE 802.11 system to which the present invention is applicable.

FIG. 3 is a diagram showing still another exemplary structure of an IEEE 802.11 system to which the present invention is applicable. In addition to the structure of FIG. 2, FIG. 3 conceptually shows an extended service set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a logical link control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One (or more than one) IBSS or ESS networks may be physically located in the same space as one (or more than one) ESS network. This may correspond to an ESS network form in the case in which an ad-hoc network operates in a location in which an ESS network is present, the case in which IEEE 802.11 networks different organizations physically overlap, or the case in which two or more different access and security policies are necessary in the same location.

Figure 4:
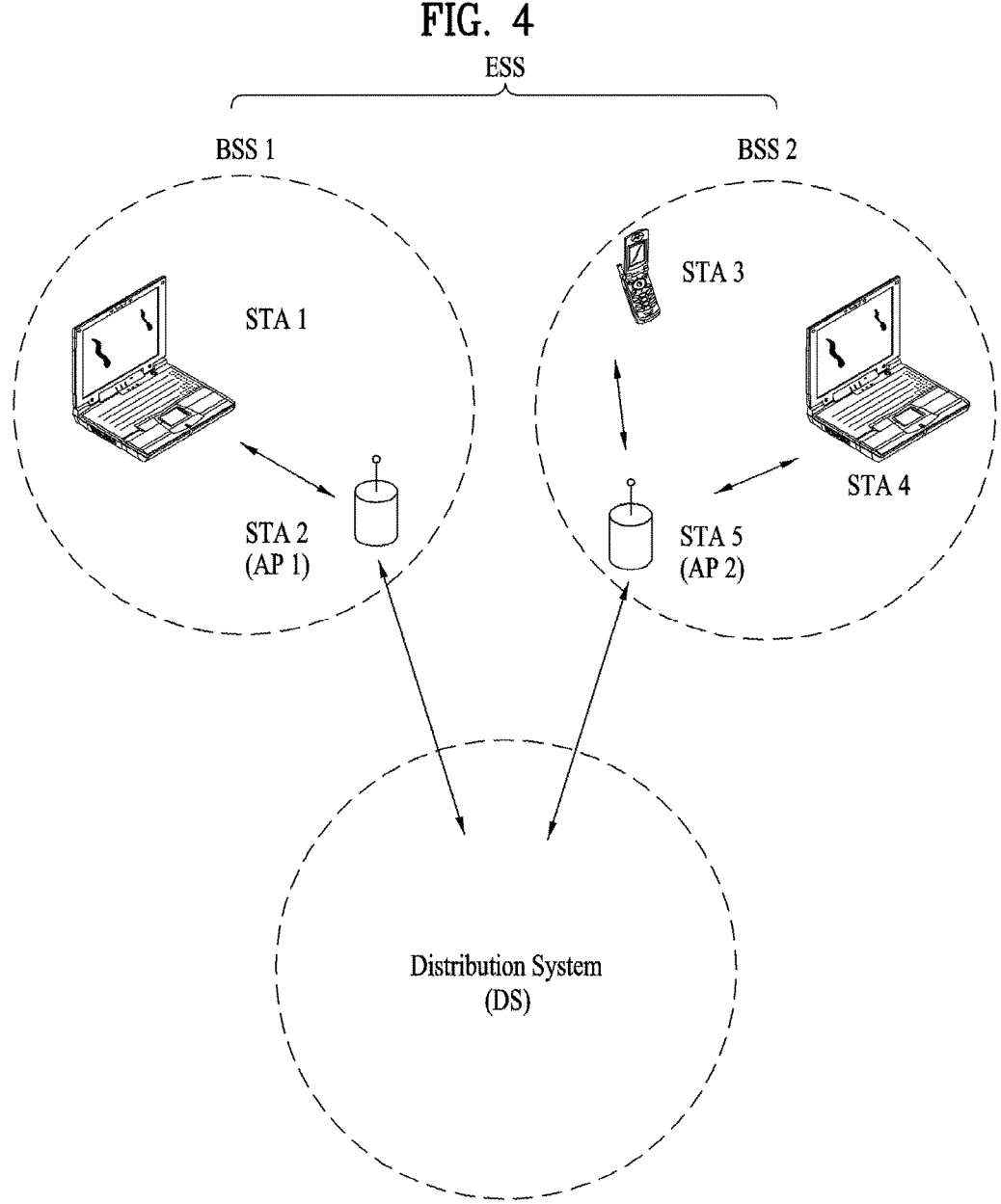
FIG. 4 is a diagram showing an exemplary structure of a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a wireless transmit/receive unit (WTRU), a user equipment (UE), a mobile station (MS), a mobile terminal, or a mobile subscriber station (MSS). The AP is a concept corresponding to a base station (BS), a Node-B, an evolved Node-B (eNB), a base transceiver system (BTS), or a femto BS in other wireless communication fields.

Link Setup Process

Figure 5:
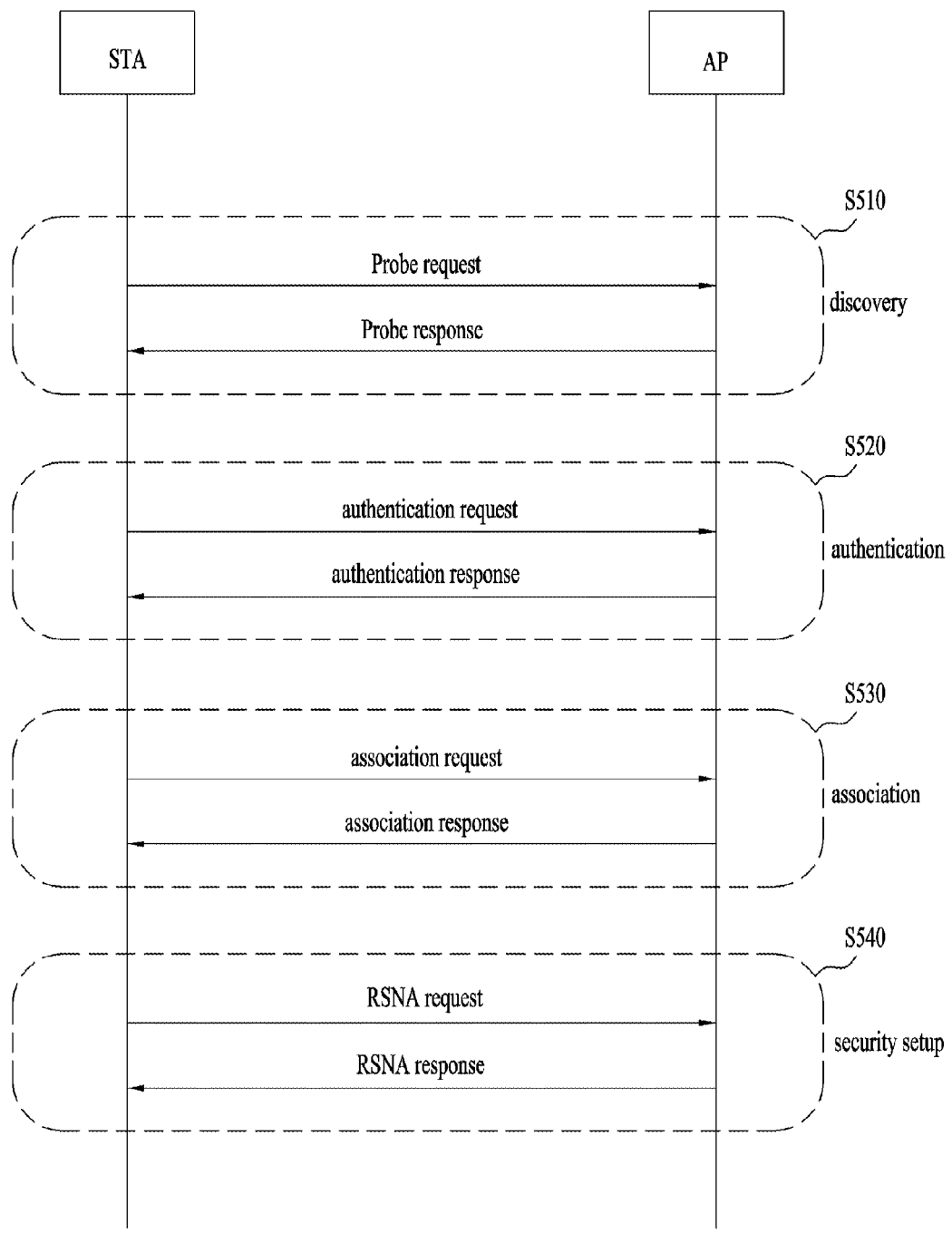
FIG. 5 illustrates a link setup process in a WLAN system.

FIG. 5 is a diagram for explaining a general link setup process.

In order to allow an STA to establish link setup on a network and transmit/receive data over the network, the STA should perform processes of network discovery, authentication, association establishment, security setup, etc. The link setup process may also be referred to as a session initiation process or a session setup process. In addition, discovery, authentication, association, and security setup of the link setup process may also be called an association process.

An exemplary link setup process is described with reference to FIG. 5.

In step S510, an STA may perform a network discovery action. The network discovery action may include an STA scanning action. That is, in order to access the network, the STA should search for an available network. The STA needs to identify a compatible network before participating in a wireless network and the process of identifying the network present in a specific area is referred to as scanning.

Scanning is categorized into active scanning and passive scanning.

FIG. 5 exemplarily illustrates a network discovery action including an active scanning process. An STA performing active scanning transmits a probe request frame in order to determine which AP is present in a peripheral region while moving between channels and waits for a response to the probe request frame. A responder transmits a probe response frame in response to the probe request frame to the STA that has transmitted the probe request frame. Here, the responder may be an STA that has finally transmitted a beacon frame in a BSS of the scanned channel. Since an AP transmits a beacon frame in a BSS, the AP is a responder. In an IBSS, since STAs of the IBSS sequentially transmit the beacon frame, a responder is not the same. For example, an STA, that has transmitted the probe request frame at channel #1 and has received the probe response frame at channel #1, stores BSS-related information contained in the received probe response frame, and moves to the next channel (e.g. channel #2). In the same manner, the STA may perform scanning (i.e. probe request/response transmission and reception at Channel #2).

Although not shown in FIG. 5, the scanning action may also be carried out using passive scanning. An STA that performs passive scanning awaits reception of a beacon frame while moving from one channel to another channel. The beacon frame is one of management frames in IEEE 802.11. The beacon frame is periodically transmitted to indicate the presence of a wireless network and allow a scanning STA to search for the wireless network and thus join the wireless network. In a BSS, an AP is configured to periodically transmit the beacon frame and, in an IBSS, STAs in the IBSS are configured to sequentially transmit the beacon frame. Upon receipt of the beacon frame, the scanning STA stores BSS-related information contained in the beacon frame and records beacon frame information on each channel while moving to another channel. Upon receiving the beacon frame, the STA may store BSS-related information contained in the received beacon frame, move to the next channel, and perform scanning on the next channel using the same method.

Active scanning is more advantageous than passive scanning in terms of delay and power consumption.

After discovering the network, the STA may perform an authentication process in step S520. The authentication process may be referred to as a first authentication process in order to clearly distinguish this process from the security setup process of step S540.

The authentication process includes a process in which an STA transmits an authentication request frame to an AP and the AP transmits an authentication response frame to the STA in response to the authentication request frame. The authentication frame used for authentication request/response corresponds to a management frame.

The authentication frame may include information about an authentication algorithm number, an authentication transaction sequence number, a state code, a challenge text, a robust security network (RSN), a finite cyclic group (FCG), etc. The above-mentioned information contained in the authentication frame may correspond to some parts of information capable of being contained in the authentication request/response frame and may be replaced with other information or include additional information.

The STA may transmit the authentication request frame to the AP. The AP may determine whether to permit authentication for the corresponding STA based on the information contained in the received authentication request frame. The AP may provide an authentication processing result to the STA through the authentication response frame.

After the STA has been successfully authenticated, an association process may be carried out in step S530. The association process includes a process in which the STA transmits an association request frame to the AP and the AP transmits an association response frame to the STA in response to the association request frame.

For example, the association request frame may include information associated with various capabilities, a beacon listen interval, a service set identifier (SSID), supported rates, supported channels, an RSN, a mobility domain, supported operating classes, a traffic indication map (TIM) broadcast request, interworking service capability, etc.

For example, the association response frame may include information associated with various capabilities, a status code, an association ID (AID), supported rates, an enhanced distributed channel access (EDCA) parameter set, a received channel power indicator (RCPI), a received signal to noise indicator (RSNI), a mobility domain, a timeout interval (association comeback time), an overlapping BSS scan parameter, a TIM broadcast response, a quality of service (QoS) map, etc.

The above-mentioned information may correspond to some parts of information capable of being contained in the association request/response frame and may be replaced with other information or include additional information.

After the STA has been successfully associated with the network, a security setup process may be performed in step S540. The security setup process of step S540 may be referred to as an authentication process based on robust security network association (RSNA) request/response. The authentication process of step S520 may be referred to as a first authentication process and the security setup process of step S540 may also be simply referred to as an authentication process.

The security setup process of step S540 may include a private key setup process through 4-way handshaking based on, for example, an extensible authentication protocol over LAN (EAPOL) frame. In addition, the security setup process may also be performed according to other security schemes not defined in IEEE 802.11 standards.

WLAN Evolution

To overcome limitations of communication speed in a WLAN, IEEE 802.11n has recently been established as a communication standard. IEEE 802.11n aims to increase network speed and reliability and extend wireless network coverage. More specifically, IEEE 802.11n supports a high throughput (HT) of 540 Mbps or more. To minimize transmission errors and optimize data rate, IEEE 802.11n is based on MIMO using a plurality of antennas at each of a transmitter and a receiver.

With widespread supply of a WLAN and diversified applications using the WLAN, the necessity of a new WLAN system for supporting a higher processing rate than a data processing rate supported by IEEE 802.11n has recently emerged. A next-generation WLAN system supporting very high throughput (VHT) is one of IEEE 802.11 WLAN systems which have been recently proposed to support a data processing rate of 1 Gbps or more in a MAC service access point (SAP), as the next version (e.g. IEEE 802.11ac) of an IEEE 802.11n WLAN system.

To efficiently utilize a radio frequency (RF) channel, the next-generation WLAN system supports a multiuser (MU)-MIMO transmission scheme in which a plurality of STAs simultaneously accesses a channel. In accordance with the MU-MIMO transmission scheme, an AP may simultaneously transmit packets to at least one MIMO-paired STA.

In addition, support of WLAN system operations in whitespace (WS) has been discussed. For example, technology for introducing the WLAN system in TV WS such as an idle frequency band (e.g. 54 to 698 MHz band) due to transition to digital TVs from analog TVs has been discussed under the IEEE 802.11af standard. However, this is for illustrative purposes only, and the WS may be a licensed band capable of being primarily used only by a licensed user. The licensed user is a user who has authority to use the licensed band and may also be referred to as a licensed device, a primary user, an incumbent user, etc.

For example, an AP and/or STA operating in WS should provide a function for protecting the licensed user. As an example, assuming that the licensed user such as a microphone has already used a specific WS channel which is a frequency band divided by regulations so as to include a specific bandwidth in the WS band, the AP and/or STA cannot use the frequency band corresponding to the corresponding WS channel in order to protect the licensed user. In addition, the AP and/or STA should stop using the corresponding frequency band under the condition that the licensed user uses a frequency band used for transmission and/or reception of a current frame.

Therefore, the AP and/or STA needs to determine whether a specific frequency band of a WS band can be used, in other words, whether a licensed user is present in the frequency band. A scheme for determining whether a licensed user is present in a specific frequency band is referred to as spectrum sensing. An energy detection scheme, a signature detection scheme, etc. are used as the spectrum sensing mechanism. The AP and/or STA may determine that the frequency band is being used by a licensed user if the intensity of a received signal exceeds a predetermined value or if a DTV preamble is detected.

Machine-to-machine (M2M) communication technology has been discussed as next generation communication technology. Technical standard for supporting M2M communication has been developed as IEEE 802.11ah in an IEEE 802.11 WLAN system. M2M communication refers to a communication scheme including one or more machines or may also be called machine type communication (MTC) or machine-to-machine communication. In this case, the machine refers to an entity that does not require direct manipulation or intervention of a user. For example, not only a meter or vending machine including a radio communication module but also a user equipment (UE) such as a smartphone capable of performing communication by automatically accessing a network without user manipulation/intervention may be machines. M2M communication may include device-to-device (D2D) communication and communication between a device and an application server. As exemplary communication between a device and an application server, communication between a vending machine and an application server, communication between a point of sale (POS) device and an application server, and communication between an electric meter, a gas meter, or a water meter and an application server. M2M communication-based applications may include security, transportation, healthcare, etc. In the case of considering the above-mentioned application examples, M2M communication has to support occasional transmission/reception of a small amount of data at low speed under an environment including a large number of devices.

More specifically, M2M communication should support a large number of STAs. Although a currently defined WLAN system assumes that one AP is associated with a maximum of 2007 STAs, methods for supporting other cases in which more STAs (e.g. about 6000 STAs) than 2007 STAs are associated with one AP have been discussed in M2M communication. In addition, it is expected that many applications for supporting/requesting a low transfer rate are present in M2M communication. In order to smoothly support these requirements, an STA in the WLAN system may recognize the presence or absence of data to be transmitted thereto based on a TIM element and methods for reducing the bitmap size of the TIM have been discussed. In addition, it is expected that much traffic having a very long transmission/reception interval is present in M2M communication. For example, a very small amount of data such as electric/gas/water metering needs to be transmitted and received at long intervals (e.g. every month). Accordingly, although the number of STAs associated with one AP increases in the WLAN system, methods for efficiently supporting the case in which there are a very small number of STAs each including a data frame to be received from the AP during one beacon period has been discussed.

As described above, WLAN technology is rapidly developing and not only the above-mentioned exemplary technologies but also other technologies including direct link setup, improvement of media streaming throughput, support of high-speed and/or large-scale initial session setup, and support of extended bandwidth and operating frequency are being developed.

Medium Access Mechanism

In a WLAN system based on IEEE 802.11, a basic access mechanism of medium access control (MAC) is a carrier sense multiple access with collision avoidance (CSMA/CA) mechanism. The CSMA/CA mechanism is also referred to as a distributed coordination function (DCF) of the IEEE 802.11 MAC and basically adopts a "listen before talk" access mechanism. In this type of access mechanism, an AP and/or an STA may sense a wireless channel or a medium during a predetermined time duration (e.g. DCF interframe space (DIFS) before starting transmission. As a result of sensing, if it is determined that the medium is in an idle status, the AP and/or the STA starts frame transmission using the medium. Meanwhile, if it is sensed that the medium is in an occupied state, the AP and/or the STA does not start its transmission and may attempt to perform frame transmission after setting and waiting for a delay duration (e.g. a random backoff period) for medium access. Since it is expected that multiple STAs attempt to perform frame transmission after waiting for different time durations by applying the random backoff period, collision can be minimized.

An IEEE 802.11 MAC protocol provides a hybrid coordination function (HCF) based on the DCF and a point coordination function (PCF). The PCF refers to a scheme of performing periodic polling by using a polling-based synchronous access method so that all reception APs and/or STAs can receive a data frame. The HCF includes enhanced distributed channel access (EDCA) and HCF controlled channel access (HCCA). EDCA is a contention based access scheme used by a provider to provide a data frame to a plurality of users. HCCA uses a contention-free based channel access scheme employing a polling mechanism. The HCF includes a medium access mechanism for improving QoS of a WLAN and QoS data may be transmitted in both a contention period (CP) and a contention-free period (CFP).

FIG. 6 is a diagram for explaining a backoff process.

Operations based on a random backoff period will now be described with reference to FIG. 6. If a medium of an occupy or busy state transitions to an idle state, several STAs may attempt to transmit data (or frames). As a method for minimizing collision, each STA may select a random backoff count, wait for a slot time corresponding to the selected backoff count, and then attempt to start data or frame transmission. The random backoff count may be a pseudo-random integer and may be set to one of 0 to CW values. In this case, CW is a contention window parameter value. Although CWmin is given as an initial value of the CW parameter, the initial value may be doubled in case of transmission failure (e.g. in the case in which ACK for the transmission frame is not received). If the CW parameter value reaches CWmax, the STAs may attempt to perform data transmission while CWmax is maintained until data transmission is successful. If data has been successfully transmitted, the CW parameter value is reset to CWmin. Desirably, CW, CWmin, and CWmax are set to 2n−1 (where n=0, 1, 2, . . . ).

If the random backoff process is started, the STA continuously monitors the medium while counting down the backoff slot in response to the determined backoff count value. If the medium is monitored as the occupied state, the countdown stops and waits for a predetermined time. If the medium is in the idle status, the remaining countdown restarts.

As shown in the example of FIG. 6, if a packet to be transmitted to MAC of STA3 arrives at STA3, STA3 may confirm that the medium is in the idle state during a DIFS and directly start frame transmission. In the meantime, the remaining STAs monitor whether the medium is in the busy state and wait for a predetermined time. During the predetermined time, data to be transmitted may occur in each of STA1, STA2, and STA5. If it is monitored that the medium is in the idle state, each STA waits for the DIFS time and then may perform countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupation of STA2 is finished and the medium re-enters the idle state, each of STA1 and STA5 waits for a predetermined time DIFS and restarts backoff counting. That is, after counting down the remaining backoff time corresponding to the residual backoff time, each of STA1 and STA5 may start frame transmission. Since the residual backoff time of STA5 is shorter than that of STA1, STA5 starts frame transmission. Meanwhile, data to be transmitted may occur even in STA4 while STA2 occupies the medium. In this case, if the medium is in the idle state, STA4 may wait for the DIFS time, perform countdown in response to the random backoff count value selected thereby, and then start frame transmission. FIG. 6 exemplarily shows the case in which the residual backoff time of STA5 is identical to the random backoff count value of STA4 by chance. In this case, collision may occur between STA4 and STA5. Then, each of STA4 and STA5 does not receive ACK, resulting in occurrence of data transmission failure. In this case, each of STA4 and STA5 may increase the CW value by two times, select a random backoff count value, and then perform countdown. Meanwhile, STA1 waits for a predetermined time while the medium is in the occupied state due to transmission of STA4 and STA5. If the medium is in the idle state, STA1 may wait for the DIFS time and then start frame transmission after lapse of the residual backoff time.

STA Sensing Operation

As described above, the CSMA/CA mechanism includes not only a physical carrier sensing mechanism in which the AP and/or an STA directly senses a medium but also a virtual carrier sensing mechanism. The virtual carrier sensing mechanism can solve some problems such as a hidden node problem encountered in medium access. For virtual carrier sensing, MAC of the WLAN system may use a network allocation vector (NAV). The NAV is a value used to indicate a time remaining until an AP and/or an STA which is currently using the medium or has authority to use the medium enters an available state to another AP and/or STA. Accordingly, a value set to the NAV corresponds to a reserved time in which the medium will be used by an AP and/or STA configured to transmit a corresponding frame. An STA receiving the NAV value is not allowed to perform medium access during the corresponding reserved time. For example, NAV may be set according to the value of a 'duration' field of a MAC header of a frame.

A robust collision detection mechanism has been proposed to reduce the probability of collision. This will be described with reference to FIGS. 7 and 8. Although an actual carrier sensing range is different from a transmission range, it is assumed that the actual carrier sensing range is identical to the transmission range for convenience of description.

FIG. 7 is a diagram for explaining a hidden node and an exposed node.

FIG. 7(a) exemplarily shows a hidden node. In FIG. 7(a), STA A communicates with STA B, and STA C has information to be transmitted. Specifically, STA C may determine that a medium is in an idle state when performing carrier sensing before transmitting data to STA B, although STA A is transmitting information to STA B. This is because transmission of STA A (i.e. occupation of the medium) may not be detected at the location of STA C. In this case, STA B simultaneously receives information of STA A and information of STA C, resulting in occurrence of collision. Here, STA A may be considered a hidden node of STA C.

FIG. 7(b) exemplarily shows an exposed node. In FIG. 7(b), in a situation in which STA B transmits data to STA A, STA C has information to be transmitted to STA D. If STA C performs carrier sensing, it is determined that a medium is occupied due to transmission of STA B. Therefore, although STA C has information to be transmitted to STA D, since the medium-occupied state is sensed, STA C should wait for a predetermined time until the medium is in the idle state. However, since STA A is actually located out of the transmission range of STA C, transmission from STA C may not collide with transmission from STA B from the viewpoint of STA A, so that STA C unnecessarily enters a standby state until STA B stops transmission. Here, STA C is referred to as an exposed node of STA B.

Figure 8:
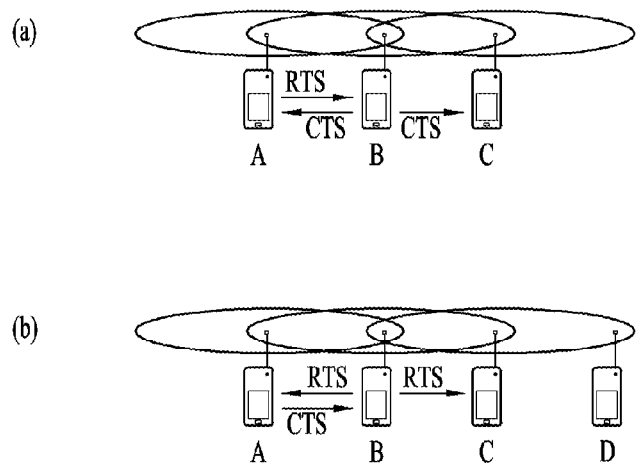
FIG. 8 illustrates RTS and CTS.

FIG. 8 is a diagram for explaining request to send (RTS) and clear to send (CTS).

To efficiently utilize a collision avoidance mechanism under the above-mentioned situation of FIG. 7, it is possible to use a short signaling packet such as RTS and CTS. RTS/CTS between two STAs may be overheard by peripheral STA(s), so that the peripheral STA(s) may consider whether information is transmitted between the two STAs. For example, if an STA to be used for data transmission transmits an RTS frame to an STA receiving data, the STA receiving data may inform peripheral STAs that itself will receive data by transmitting a CTS frame to the peripheral STAs.

FIG. 8(a) exemplarily shows a method for solving problems of a hidden node. In FIG. 8(a), it is assumed that both STA A and STA C are ready to transmit data to STA B. If STA A transmits RTS to STA B, STA B transmits CTS to each of STA A and STA C located in the vicinity of the STA B. As a result, STA C waits for a predetermined time until STA A and STA B stop data transmission, thereby avoiding collision.

FIG. 8(b) exemplarily shows a method for solving problems of an exposed node. STA C performs overhearing of RTS/CTS transmission between STA A and STA B, so that STA C may determine that no collision will occur although STA C transmits data to another STA (e.g. STA D). That is, STA B transmits RTS to all peripheral STAs and only STA A having data to be actually transmitted may transmit CTS. STA C receives only the RTS and does not receive the CTS of STA A, so that it can be recognized that STA A is located outside of the carrier sensing range of STA C.

Power Management

As described above, the WLAN system needs to perform channel sensing before an STA performs data transmission/reception. The operation of always sensing the channel causes persistent power consumption of the STA. Power consumption in a reception state is not greatly different from that in a transmission state. Continuous maintenance of the reception state may cause large load to a power-limited STA (i.e. an STA operated by a battery). Therefore, if an STA maintains a reception standby mode so as to persistently sense a channel, power is inefficiently consumed without special advantages in terms of WLAN throughput. In order to solve the above-mentioned problem, the WLAN system supports a power management (PM) mode of the STA.

The PM mode of the STA is classified into an active mode and a power save (PS) mode. The STA basically operates in the active mode. The STA operating in the active mode maintains an awake state. In the awake state, the STA may perform a normal operation such as frame transmission/reception or channel scanning. On the other hand, the STA operating in the PS mode is configured to switch between a sleep state and an awake state. In the sleep state, the STA operates with minimum power and performs neither frame transmission/reception nor channel scanning.

Since power consumption is reduced in proportion to a specific time in which the STA stays in the sleep state, an operation time of the STA is increased. However, it is impossible to transmit or receive a frame in the sleep state so that the STA cannot always operate for a long period of time. If there is a frame to be transmitted to an AP, the STA operating in the sleep state is switched to the awake state to transmit/receive the frame. On the other hand, if the AP has a frame to be transmitted to the STA, the sleep-state STA is unable to receive the frame and cannot recognize the presence of a frame to be received. Accordingly, the STA may need to switch to the awake state according to a specific period in order to recognize the presence or absence of a frame to be transmitted thereto (or in order to receive the frame if the AP has the frame to be transmitted thereto).

Figure 9:
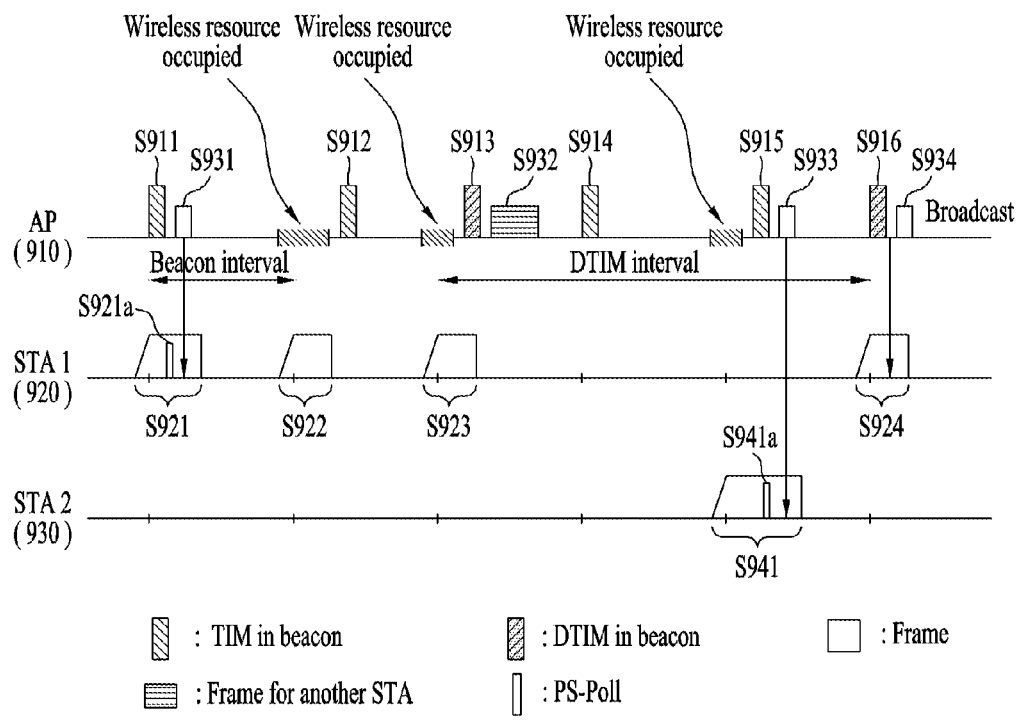
FIG. 9 illustrates a power management operation.

FIG. 9 illustrates a power management operation.

Referring to FIG. 9, AP 910 transmits a beacon frame to STAs present in the BSS with a certain periodicity (S911, S912, S913, S914, S915 and S916). The beacon frame includes a traffic indication map (TIM) information element. The TIM information element contains information indicating that AP 910 has buffered traffic for the STAs associated with AP 910 and that a frame will be transmitted. The TIM element includes a TIM used to inform of a unicast frame and a delivery traffic indication map (DTIM) used to inform of a multicast or broadcast frame.

AP 910 may transmit a DTIM once per three transmissions of the beacon frame. STA1 920 and STA2 922 are STAs operating in the PS mode. Each of STA1 920 and STA2 922 may be switched from the sleep state to the awake state at every wakeup interval of a predetermined period to receive (or listen to) the TIM element transmitted by the AP 910. Each STA may calculate a switching time to switch to the awake state, based on its own local clock. In the example shown in FIG. 15, it is assumed that the clock of the STA coincides with that of the AP.

For example, the predetermined wakeup interval may be set in such a manner that STA1 920 can switch to the awake state at every beacon interval to receive the TIM element. Accordingly, when AP 910 transmits the beacon frame for the first time (S911), STA1 920 may switch to the awake state (S921). Thereby, STA1 920 may receive the beacon frame and acquire the TIM element. If the acquired TIM element indicates that there is a frame to be transmitted to STA1 920, STA1 920 may transmit a power save (PS)-Poll frame, which requests transmission of the frame, to the AP 910 (S921a). In response to the PS-Poll frame, the AP 910 may transmit the frame to STA1 920 (S931). After completing reception of the frame, STA1 920 is switched back to the sleep state and operates in the sleep state.

When the AP 910 transmits the beacon frame for the second time, the medium is in the busy state in which the medium is accessed by another device, and accordingly the AP 910 may not transmit the beacon frame at the correct beacon interval, but may transmit the beacon frame at a delayed time (S912). In this case, STA1 920 is switched to the awake state in accordance with the beacon interval, but does not receive the beacon frame whose transmission is delayed, and is thus switched back to the sleep state (S922).

When the AP 910 thirdly transmits the beacon frame, the beacon frame may include a TIM element set to a DTIM. However, since the medium is in the busy state, the AP 910 transmits the beacon frame at a delayed time (S913). STA1 920 may be switched to the awake state in accordance with the beacon interval and acquire the DTIM through the beacon frame transmitted by the AP 910. It is assumed that the DTIM acquired by STA1 920 indicates that there is no frame to be transmitted to STA1 920, but there is a frame for another STA. In this case, STA1 920 may confirm that there is no frame to receive and switch back to the sleep state to operate in the sleep state. After transmission of the beacon frame, the AP 910 transmits the frame to the corresponding STA (S932).

The AP 910 fourthly transmits the beacon frame (S914). STA1 920 may adjust the wakeup interval for reception of the TIM element since it has failed to acquire information indicating presence of buffered traffic for STA1 920 through the previous two operations of reception of the TIM element. Alternatively, provided that signaling information for adjustment of the value of the wakeup interval of STA1 920 is contained in the beacon frame transmitted by the AP 910, the wakeup interval value of the STA1 920 may be adjusted. In this example, STA1 920 may be set to be switched to the awake state once at every three beacon intervals to receive a TIM element, rather than being set to be switched between the operating states at every beacon interval. Therefore, when the AP 910 fifthly transmits the beacon frame (S915) after the fourth transmission of the beacon frame (S914), STA1 920 remains in the sleep state, and thus cannot acquire the corresponding TIM element.

When AP 910 sixthly transmits the beacon frame (S916), STA1 920 may be switched to the awake state and acquire the TIM element contained in the beacon frame (S924). Since the TIM element is a DTIM indicating presence of a broadcast frame, STA1 920 may receive the broadcast frame transmitted by the AP 910 without transmitting a PS-Poll frame to the AP 910 (S934). In the meantime, the wakeup interval set for STA2 930 may have a longer period than the wakeup interval of STA1 920. Accordingly, STA2 930 is switched to the awake state at a time point (S915) when the AP 910 fifthly transmits the beacon frame, such that the STA2 930 may receive the TIM element (S941). STA2 930 may recognize presence of a frame to be transmitted thereto through the TIM element and transmit the PS-Poll frame to the AP 910 in order to request frame transmission (S941a). The AP 910 may transmit a frame to STA2 930 in response to the PS-Poll frame (S933).

In order to operate/manage the PS mode as shown in FIG. 9, the TIM element includes a TIM indicating presence or absence of a frame to be transmitted to the STA or a DTIM indicating presence or absence of a broadcast/multicast frame. The DTIM may be implemented through a field configuration for the TIM element.

Figure 10:
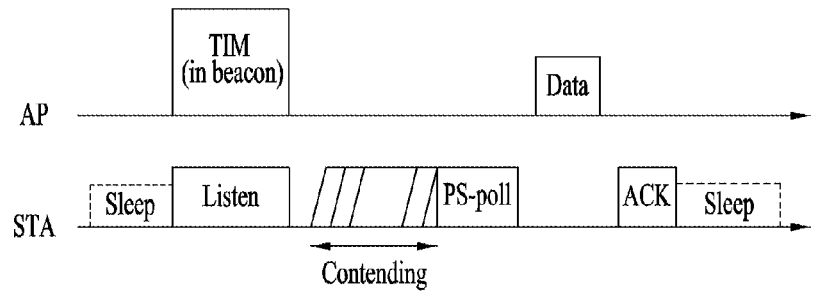
FIGS. 10 to 12 illustrate operations of a station (STA) having received a TIM in detail.
Figure 11:
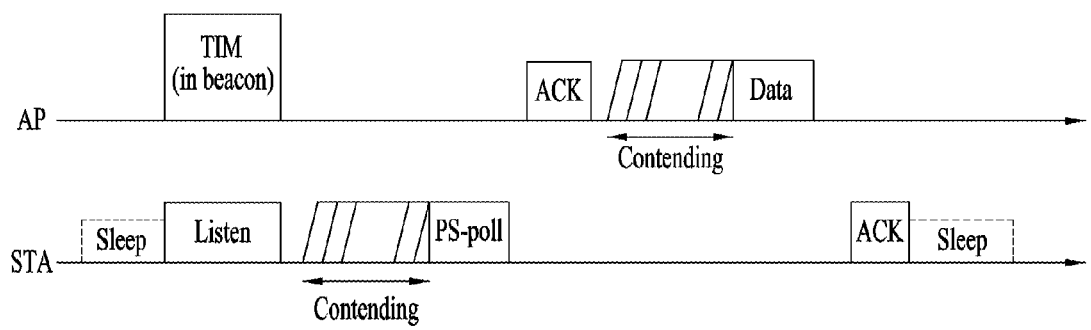
Figure 12:
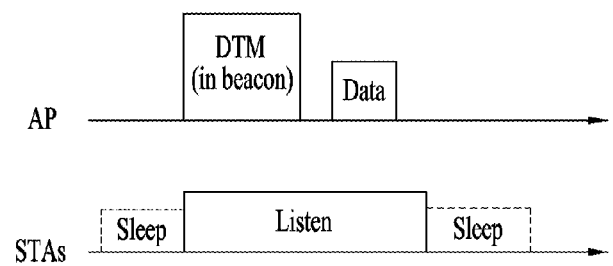

FIGS. 10 to 12 illustrate operations of an STA having received a TIM in detail.

Referring to FIG. 10, an STA switches from the sleep state to the awake state to receive (or listen to) the beacon frame including a TIM from the AP. The STA may recognize presence of buffered traffic (data) to be transmitted thereto by interpreting the received TIM element. After the STA contends with other STAs to access the medium for PS-Poll frame transmission, the STA may transmit a PS-Poll frame to the AP to request data frame transmission. The AP, upon receiving the PS-Poll frame transmitted from the STA, may transmit a data frame to the STA. The STA may receive the data frame and transmit an ACK frame to the AP in response to the received data frame. Thereafter, the STA may switch back to the sleep state.

As shown in FIG. 10, the AP may operate in a manner of immediate response in which the AP transmits the data frame when a predetermined time (e.g., a short interframe space (SIFS)) elapses after the AP receives the PS-Poll frame from the STA. However, the AP may operate in a manner of deferred response if the AP fails to prepare a data frame to be transmitted to the STA for the SIFS time after receiving the PS-Poll frame, which will be described in detail with reference to FIG. 11.

In the example of FIG. 11, the operations of the STA of switching from the sleep state to the awake state, receiving a TIM from the AP, and transmitting the PS-Poll frame to the AP through contention are identical to those in the example of FIG. 10. If the AP having received the PS-Poll frame fails to prepare a data frame for the SIFS time, the AP may transmit an ACK frame to the STA instead of transmitting the data frame. If the data frame is prepared after transmission of the ACK frame, the AP may perform contention and transmit the data frame to the STA. The STA may transmit the ACK frame indicating successful reception of the data frame to the AP, and then be switched to the sleep state.

FIG. 12 shows an exemplary case in which AP transmits DTIM. STAs may be switched from the sleep state to the awake state so as to receive the beacon frame including a DTIM element from the AP. The STAs may recognize, through the received DTIM, that a multicast/broadcast frame will be transmitted. After transmitting the beacon frame including the DTIM, the AP may immediately transmit data (i.e., a multicast/broadcast frame) without transmitting/receiving the PS-Poll frame. While the STAs continue to maintain the awake state even after receiving the beacon frame including the DTIM, the STAs may receive data and then switch back to the sleep state after data reception is completed.

TIM Structure

In the operation and management method of the power save (PS) mode based on the TIM (or DTIM) protocol illustrated in FIGS. 9 to 12, STAs may determine presence or absence of a data frame to be transmitted thereto through STA identification information contained in the TIM element. STA identification information may be specific information associated with an association identifier (AID) to be allocated when an STA is associated with an AP.

The AID is used as a unique ID of each STA within a BSS. For example, in the current WLAN system, an AID may be assigned a value between 1 and 2007. In the currently defined WLAN system, 14 bits for the AID may be allocated to a frame transmitted by an AP and/or an STA. Although the AID may be assigned any value up to 16383, values from 2008 to 16383 are set as reserved values.

The TIM element according to legacy definition is inappropriate for M2M application in which a large number of STAs (e.g., at least 2007 STAs) are associated with one AP. If the conventional TIM structure is extended without any change, the TIM bitmap size may excessively increase. Accordingly, it may be impossible to support the extended TIM structure using the legacy frame format, and the extended TIM structure is inappropriate for M2M communications in which application of a low transfer rate is considered. In addition, it is expected that the number of STAs having a reception data frame during one beacon period is very small. Therefore, in view of the aforementioned exemplary application of M2M communication, it is expected that a TIM bitmap will have a large size with most bits set to zero (0) in many cases. Therefore, there is a need for a technology capable of efficiently compressing a bitmap.

In the legacy bitmap compression technology, a series of 0s is omitted from the front part of a bitmap to define an offset (or start point) value. However, compression efficiency is not high in the case in which the number of STAs including a buffered frame is small, but there is a great difference between AID values of the STAs. For example, in the case in which a frame to be transmitted only to STAs whose AIDs are set to 10 and 2000 is buffered, the length of the compressed bitmap is 1990, but all the parts of the bit map other than both end parts are set to zero (0). If the number of STAs associated with one AP is small, inefficiency of bitmap compression may not be a serious problem. However, if the number of STAs associated with one AP increases, such inefficiency may deteriorate overall system performance.

In order to address this issue, AIDs may be divided into a plurality of groups such that data can be more efficiently transmitted with the AIDs. A designated group ID (GID) is allocated to each group. Hereinafter, AIDs allocated on the group basis will be described with reference to FIG. 13.

Figure 13:
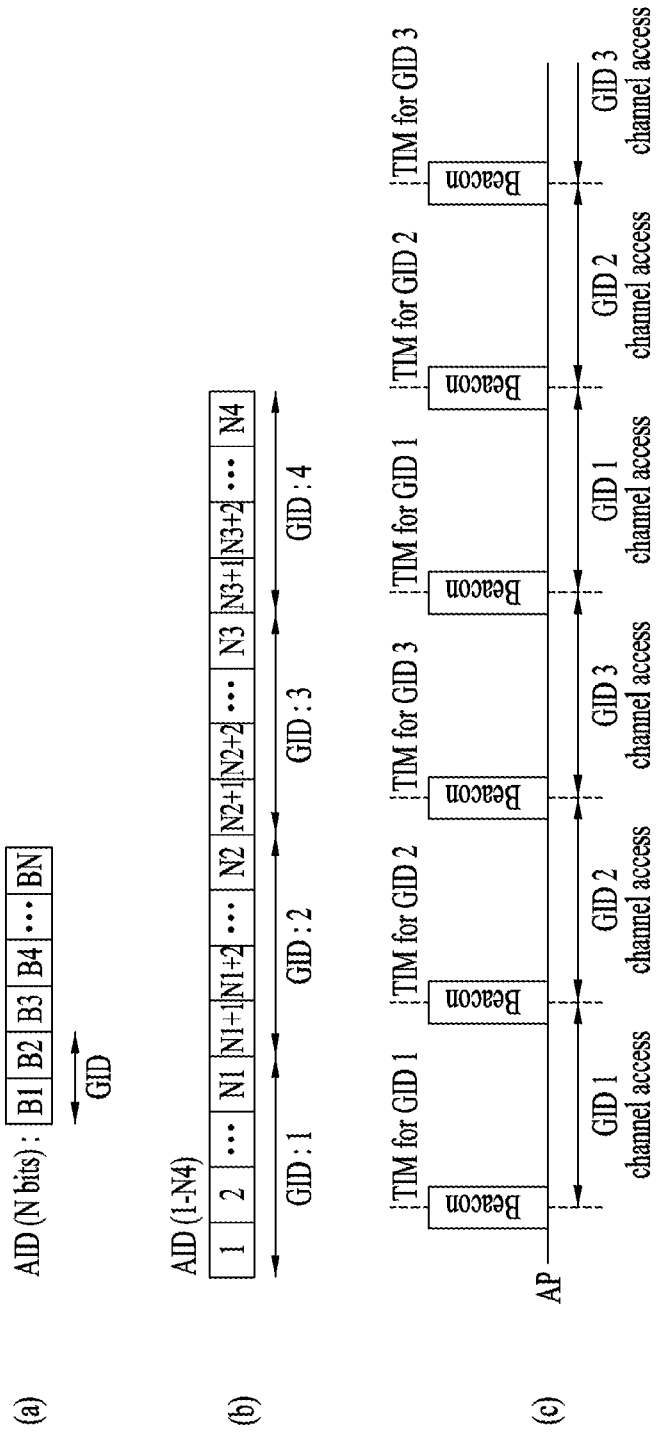
FIG. 13 illustrates group-based allocation of an association ID (AID).

FIG. 13 illustrates group-based allocation of an association ID (AID).

FIG. 13(a) is a diagram illustrating an exemplary AID allocated on the group basis. In FIG. 13(a), some bits located at the front part of the AID bitmap may be used to indicate a group ID (GID). For example, the first two bits of an AID bitmap may be used to designate four GIDs. If the total length of the AID bitmap is N bits, the value of the first two bits (B1 and B2) represents a GID of a corresponding AID.

FIG. 13(b) is a diagram illustrating another exemplary AID allocated on the group basis. In FIG. 13(b), a GID may be allocated according to the position of an AID. In this case, AIDs having the same GID may be represented by an offset and a length value. For example, if GID 1 is denoted by an offset A and a length B, this means that AIDs A to A+B−1 on a bitmap are set to GID 1. For example, FIG. 13(b) assumes that AIDs 1 to N4 are divided into four groups. In this case, AIDs belonging to GID 1 are denoted by 1 to N1, and may be represented by an offset of 1 and a length of N1. AIDs belonging to GID 2 may be represented by an offset of N1+1 and a length of N2−N1+1, AIDs belonging to GID 3 may be represented by an offset of N2+1 and a length of N3−N2+1, and AIDs belonging to GID 4 may be represented by an offset of N3+1 and a length of N4−N3+1.

If AIDs allocated on the group basis are introduced, channel access may be allowed in different time intervals according to GIDs. Thereby, the problem of lack of TIM elements for a large number of STAs may be solved and at the same time data transmission/reception may be efficiently performed. For example, in a specific time interval, channel access is allowed only for STA(s) corresponding to a specific group, and channel access of the remaining STA(s) may be restricted. A predetermined time interval in which only specific STA(s) are allowed to perform channel access may be referred to as a restricted access window (RAW).

Hereinafter, channel access based on GIDs will be described with reference to FIG. 13(c). FIG. 13(c) illustrates an exemplary channel access mechanism according to beacon intervals with AIDs divided into three groups. A first beacon interval (or a first RAW) is an interval in which channel access of an STA corresponding to an AID belonging to GID 1 is allowed, and channel access of STAs belonging to the other GIDs is not allowed. To implement this mechanism, a TIM element used only for AIDs corresponding to GID 1 is contained in a first beacon frame. A TIM element used only for AIDs corresponding to GID 2 is contained in a second beacon frame. Accordingly, channel access is allowed only for an STA corresponding to the AIDs belonging to GID 2 in a second beacon interval (or a second RAW). A TIM element used only for AIDs corresponding to GID 3 is contained in a third beacon frame. Accordingly, channel access is allowed only for an STA corresponding to the AIDs belonging GID 3 in a third beacon interval (or a third RAW). A TIM element used only for AIDs corresponding GID 1 is contained in a fourth beacon frame. Accordingly, channel access is allowed only for an STA corresponding to the AIDs belonging to GID 1 in a fourth beacon interval (or a fourth RAW). Thereafter, only channel access of an STA corresponding to a specific group indicated by the TIM contained in a corresponding beacon frame may be allowed in each of beacon intervals subsequent to the fifth beacon interval (or in each of RAWs subsequent to the fifth RAW).

While FIG. 13(c) exemplarily shows a case in which the order of allowed GIDs is cyclic or periodic according to the beacon intervals, embodiments of the present invention are not limited thereto. That is, only AID(s) belonging to specific GID(s) may be contained in a TIM element, such that only channel access of STA(s) corresponding to the specific AID(s) is allowed in a specific time interval (for example, a specific RAW), and channel access of the other STA(s) is not allowed.

The group-based AID allocation scheme as described above may also be called hierarchical structure of TIM. That is, the whole AID space may be divided into a plurality of blocks, and only STA(s) corresponding to a specific block set to a value other than 0 (namely, STA(s) of a specific group) may be allowed to perform channel access. Dividing a TIM of a large size into small blocks/groups as above may allow the STA to easily maintain TIM information and also facilitate management of the blocks/groups according to the class, quality of service (QoS), or purpose of the STA. While FIG. 13 illustrates a 2-level hierarchical structure, a TIM may be configured to have a hierarchical structure having two or more levels. For example, a whole AID space may be divided into a plurality of page groups, each page group may be divided into a plurality of blocks, and each block may be divided into a plurality of sub-blocks. In this case, as an extended version of the example of FIG. 13(a), an AID bitmap may be configured such that first N1 bits represent the page ID (i.e., PID), the next N2 bits indicate the block ID, the next N3 bits following the N2 bits represent sub-block ID, and the other bits represent the bit position of the STA in a sub-block.

In the embodiments of the present invention described below, various methods to divide STAs (or AIDs allocated to the STAs) into predetermined hierarchical groups and manage the groups may be adopted, and the group-based AID allocation scheme is not limited to the examples above.

Page Segmentation

A traffic indication map (TIM) may be segmented. If one TIM is transmitted carrying all bitmap information, both the AP serving as a transmission entity and an STA serving as a reception entity may be subjected to overhead. If the STA (which is not connected to a regular power supply) listens to all beacons, the STA may be burdened by this operation in terms of power save. This is because different bitmap information may be contained in one TIM depending on the traffic pattern or service type of the UE.

One DTIM beacon interval may contain page segments of a constant length for each TIM segment. In this case, the length of the page segment may vary among multiple DTIM beacon intervals. This is because the length of a page segment is a value obtained by diving the number of blocks per page by the number of TIM segments within a DTIM beacon interval. The ordered page segments may be consecutively assigned to a TIM segment. The first page segment may be assigned to a DTIM segment.

Hereinafter, description will be given of a segment count information element (segment count IE) for indicating assignment of an STA in the TIM segment. The segment count IE is transmitted in the DTIM beacon frame, and not transmitted in the TIM segment. The segment count IE may indicate assignment information about STAs in TIM segments. In other words, the segment count IE may indicate assignment information about TIM segments (group) to which STAs belong. The segment count IE may indicate wakeup intervals of STAs in page segments. STAs assigned to page segments consecutively wake up in the TIM segments to which the STAs belong, based on the page segment count field in the segment count IE. The length of a page segment is a value obtained by dividing the number of blocks in a page bitmap by a page segment count. The page offset field and page segment count field in the segment count IE may indicate an initial block offset and the range of the TIM element in each TIM segment.

$$\text{Block offset/start=page offset+((length of page segment)*(TIM segment number-1))+1} \quad \text{Equation 1}$$

$$\text{Block Range=page offset+length of page segment*TIM segment number} \quad \text{Equation 2}$$

STAs with a block bit set to 0 in the page bitmap field do not wake up in the assigned TIM segments.

Segment Count IE

FIG. 14 is a diagram illustrating an example of fields constructing a segment count IE.

Referring to FIG. 14, the segment count IE is configured with a length ranging from 4 to 8 octets. Element ID, which may be configured in 1 octet, is a field indicating the segment count IE. The field Length, which may be configured in 1 octet, indicates the length of the segment count IE. The field Page Index, which may be configured in 2 bits, indicates a currently assigned page in a beacon. The field Page Segment Count, which may be configured in 5 bits, indicates the number of TIM segments. For example, if Page Segment Count is set to 4, this indicates four TIM segments in the DTIM beacon interval. If the field is set to 8, this indicates eight TIM segments in the DTIM beacon interval. The field Page Offset, which may be a 5-bit field, indicates the first block of an assigned page segment. The field Reserved may be a 4-bit field. The field Page Bitmap, which may be configured with 0 to 4 octets, relates to a block of all page segments in the DTIM element. In other words, Page Bitmap indicates buffered data with a block level.

802.11ah STAs may be selected so as not to have a TIM entry for a downlink traffic signal. The AP may store downlink data and transmit the same to the STAs when there is a request from the STAs. If the TIM entry for downlink signaling is not needed, the 802.11 ah STAs may inform the AP that the TIM entry is not needed. A non-TIM STA transmits at least one PS-Poll or trigger frame in every listen interval. The non-TIM STA is not required to wake up to receive a beacon in every listen interval.

Operation of Non-TIM STA

In the non-TIM mode, a TIM need not to be received, and accordingly a non-TIM STA does not receive beacon frame information containing a TIM. The TIM has TIM entry information and a beacon frame may be received at every listen interval. However, the non-TIM STA does not reevie beacon frame information containing the TIM and therefore cannot check the TIM entry information. Accordingly, the non-TIM STA needs to access an AP even without receiving a beacon frame at every listen interval.

The AP may schedule a target wake up time (TWT) such that the non-TIM STA can access a channel. Accordingly, the non-TIM STA may switch from the sleep state to the awake state and perform channel access at the scheduled time.

Switch from Non-TIM Mode to TIM Mode

The STA is allowed to switch between the TIM mode and the non-TIM mode during operation. The STA may switch from the TIM mode to the non-TIM mode and from the non-TIM mode to the TIM mode. When mode switch occurs, the AP may reasign a new AID to the STA. The STA may transmit an AID switch request frame to the AP to inform the AP that mode switch has occurred. Upon receiving the frame, the AP may transmit an AID switch response frame to the STA.

AID Reassignment Procedure

The AID of the STA may be reassigned to perform channel access management. The STA may transmit an AID switch request frame to the AP, and the AP may in turn transmit an AID switch response frame or an unsolicited AID switch response frame to the STA after receiving the AID switch request frame.

AID Request Element

FIG. 15 is a diagram illustrating an AID request element (frame).

Hereinafter, an AID request element shown in FIG. 15 will be described. Referring to FIG. 13(a), the AID includes N elements from B1 to BN. The AID request element includes fields such as Element ID, Length, and AID Request Mode. The AID request element may include optional fields such as Wakeup Interval Peer STA Address and Service Type. The field AID Request Mode may be used to indicate an optional field of the AID request element.

Bit 0 may be set to 1 if the field Wakeup Interval is included in the AID request element. Bit 1 may be set to 1 if the field Peer STA Address is included in the AID request element. Bit 2 may be set to 1 when the field Service Type is included in the AID request element. If any of these optional fields is not included in the AID request element, the field may be set to 0. The fields may be reversely set.

If the STA switches from the TIM mode to the non-TIM mode, Bit 3 may be set to 1. If the STA switches from the non-TIM mode to the TIM mode, Bit 4 may be set to 1.

The field Wakeup Interval may indicate the value of a newly configured wakeup interval, and may represent a MAC address of a peer STA for station-to-station communication. The field Service Type may represent a service type that is newly configured for the STA.

AID Response Element

FIG. 16 is a diagram illustrating an AID response element (frame).

As shown in FIG. 16, this element is a response element to the AID request element mentioned above. The AID response element may include fields such as Element ID, Length, AID, AID Switch Count, and Wakeup Interval.

The field AID may contain AID information that is newly assigned by the AP. If the AP does not desire change of the AID of the STA, the field AID may be set to the old value. When a new AID is assigned, the field AID Switch Count indicates the number of beacon intervals before the STA switches to the new AID. When a new AID is assigned, the field Wakeup Interval indicates a wakeup interval for listening to a beacon frame including a TIM segment of the new AID.

AID Switch Request Frame

FIG. 17 is a diagram illustrating an AID switch request frame.

As shown in FIG. 17, an AID switch request frame may include fields such as Category, Action, Dialog Token, and AID Request IE.

The field Category sets a value for S1G, and the field Action sets a value for an AID request. The field Dialog Token has a value selected by a non-AP STA and transmitted to confirm the operation of requesting/responding to an AID switch request frame. The field AID Request IE includes an AID request element.

AID Switch Response Frame

FIG. 18 is a diagram illustrating an AID switch response frame.

As shown in FIG. 18, an AID switch response frame may include fields such as Category, Action, Dialog Token, and AID Response IE.

The field Category sets a value for S1G, and the field Action sets a value for an AID response. The field Dialog Token has a value corresponding to the AID switch request frame. If the AID switch response frame is not transmitted in response to the AID switch request frame, Dialog Token may be set to 0. The field AID Request IE includes an AID response element.

Hereinafter, description will be given of a method for performing channel access by an STA switching from the non-TIM mode to the TIM mode when a TIM is divided by TIM segmentation and transmitted.

Figure 19:
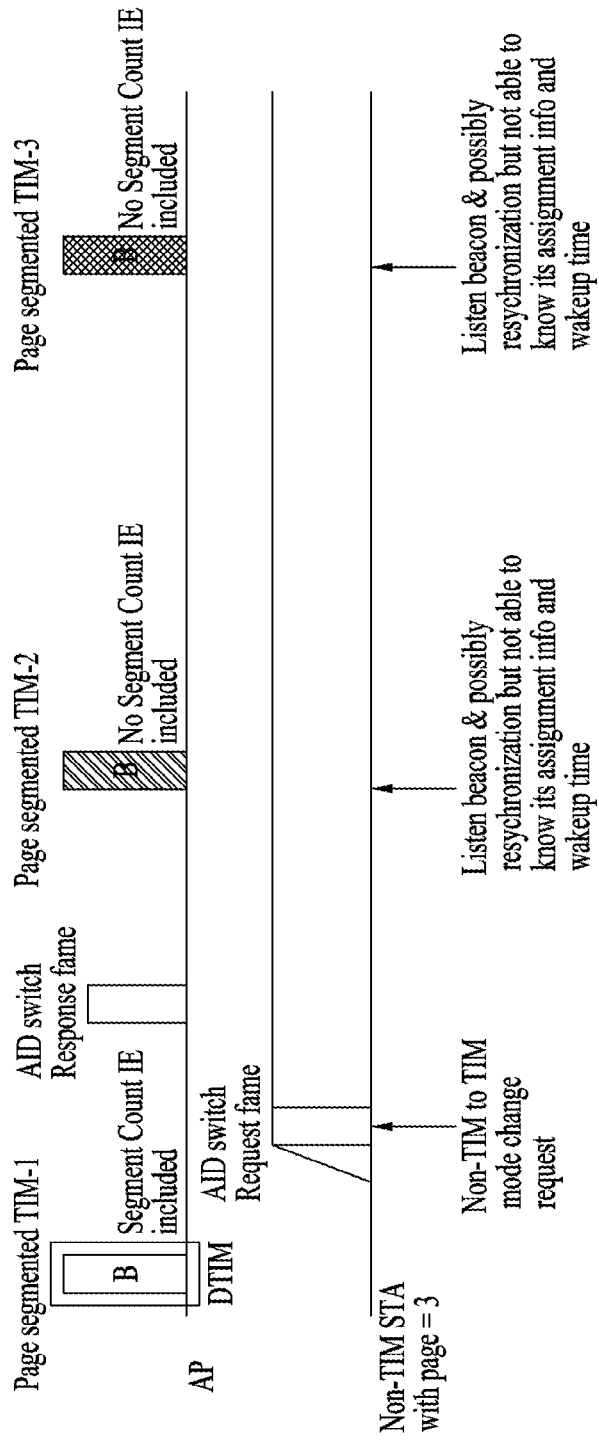
FIG. 19 illustrates a method for accessing a channel when the non-TIM mode is switched to the TIM mode.

FIG. 19 illustrates a method for performing channel access when the non-TIM mode is switched to the TIM mode.

Referring to FIG. 19, an STA operating in the non-TIM mode switches to the TIM mode. In this example, it is assumed that a segmented TIM to which the STA belongs in the TIM mode is 3. It can be seen from the figure that the time at which the STA switches to the TIM mode is later than the time at which a beacon frame including a DTIM is broadcast. Since the TIM STA has not received DTIM information, the TIM STA is unaware of TIM-related information. The DTIM information may include Segment Count IE information indicating TIM segmentation information. Segment Count IE includes information indicating a segmented TIM to which the TIM STA belongs and may further include reception time-related information indicating when the segmented TIM is transmitted. If a segmented TIM does not contain information related to paging of the STA or a segment count IE which is broadcast through DTIM, the STA needs to wait until the next beacon containing a DTIM is received to acquire the segment count IE or the paging-related information. In this case, the STA needs to continuously operate in the awake state since it does not know when the next DTIM beacon will be transmitted. Continuously operating in the awake state may apply overhead to the STA in terms of power saving or operations the STA should perform.

Figure 20:
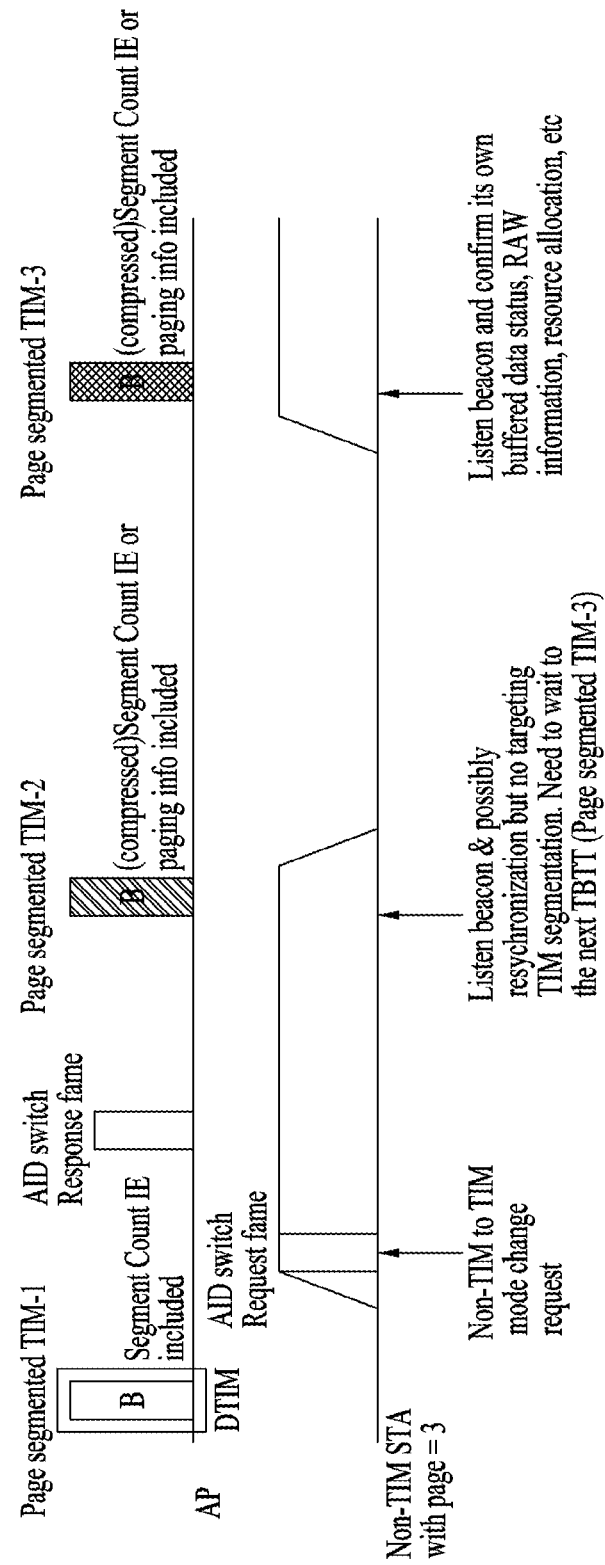
FIG. 20 illustrates another method for accessing a channel when the non-TIM mode is switched to the TIM mode.

FIG. 20 illustrates another method for accessing a channel when the non-TIM mode is switched to the TIM mode.

In the example of FIG. 20, each segmented TIM (e.g., page segmented TIM-2) of FIG. 14 includes a segment count IE, a compressed version of the segment count IE, or paging information about the STA.

The TIM STA remains in the awake state from the time the STA switches to the TIM mode until it listens to a beacon containing the next segmented TIM. As shown in FIG. 15, the TIM STA receives segmented TIM-2, i.e., the next segmented TIM. Then, the TIM STA may acquire segment count IE or paging information through segmented TIM-2. Thereby, the TIM STA may recognize a segmented TIM to which the TIM STA belongs and the time to receive a TIM. In other words, the TIM STA may recognize information contained in the DTIM which the TIM STA misses when it switches to the TIM mode. Accordingly, the STA staying in the sleep state is capable of receiving a segmented TIM by switching to the awake state in accordance with the time at which the STA receives the segmented TIM to which the STA belongs. Upon receiving the segmented TIM, the STA may acquire a buffered data status, restricted access window (RAW) information, resource allocation information, and the like. In this case, however, if the STA is required to immediately acquire system information through a beacon frame (or control frame) and perform an operation such as upgrade/update, power consumption and latency may occur until the STA receives the segmented TIM to which the STA belongs.

Hereinafter, description will be given of a proposed method of the present invention for efficiently performing channel access without suffering the problems mentioned above with reference to FIGS. 21 and 22.

Embodiment 1

Figure 21:
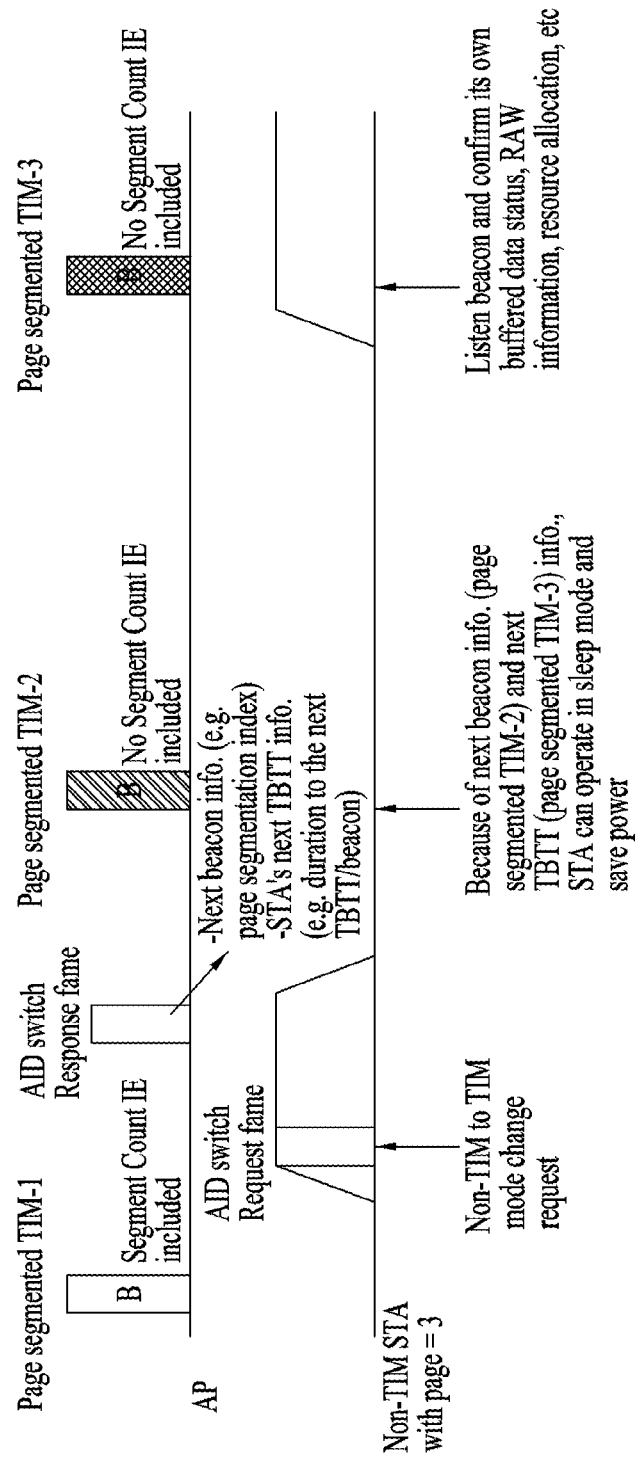
FIG. 21 illustrates a channel access method according to an embodiment of the present invention.

FIG. 21 illustrates a method for performing channel access by an STA switching from the non-TIM mode to the TIM mode according to an embodiment of the present invention.

As shown in FIG. 21, the STA is in the non-TIM mode and thus cannot receive (listen to) a TIM or DTIM. The DTIM contains a segment count IE, which contains TIM segmentation information indicating a segmented TIM to which the STA belongs and the time for the STA to receive the segmented TIM. An STA having switched from the non-TIM mode to the TIM mode may fail to receive TIM (or DTIM) information from the AP and accordingly may not know TIM segmentation information. In this case, the STA needs to wait until it receives the next DTIM containing the segment count IE in order to know a segmented TIM to which the STA belongs and the time to receive the segmented TIM. However, continuously waiting may cause a problem in terms of power saving, and thus an efficient method is required.

In the proposed method, when the STA switches from the non-TIM mode to the TIM mode, the STA transmits mode switch request frame information to the AP, receives, from the AP, response frame information which is a response to the mode switch request frame information, and switches back to the sleep state. Then, the STA may switch from the sleep state to the awake state or listen to beacon frame information containing a segmented TIM to which the STA belongs, based on the received response frame information. Herein, the response frame information may include next beacon information and next target beacon transmission time (TBTT) information about the STA. Thereby, the STA may receive TIM (DTIM) information contained in the beacon frame. Details are given below.

In order to allow the STA to switch to the TIM mode, an AID switch response frame, which is a response frame to the AID switch request frame transmitted from the STA to the AP, may be transmitted, including the next beacon information and the next TBTT information about the STA.

The next beacon information may include page index information of a segmented TIM received for the first time at the time the mode switch occurs, a timestamp value which may be an absolute value of the mode switch time and information corresponding to a duration before the next segmented TIM is received.

The next TBTT information may include information corresponding to a duration before the segmented TIM to which the STA belongs is received, a timestamp value which may be an absolute value of the mode switch time, and paging information about the STA. Herein, the TBTT refers to a time between the segmented TIM to which the STA belongs and the next segmented TIM.

Once the STA receives the aforementioned information in the AID switch response frame, the STA switches to the sleep or doze state to save power. The STA waiting in the sleep state may switch to the awake state at the reception time and receive (listen to) a beacon according to the information of the segmented TIM to which the STA belongs and the reception time information. As illustrated in FIG. 16, the segmented TIM by which the TIM STA is paged is 3, and thus the STA may wait in the sleep state without receiving page segmented TIM-2 and then wake up in page segmented TIM-3 to receive a beacon. The received beacon may include buffered data status, RAW information, and resource assignment information.

Embodiment 2—AID Reassignment

FIG. 21 illustrates channel access performed by an STA having switched from the non-TIM mode to the TIM mode according to an embodiment of the present invention.

Figure 22:
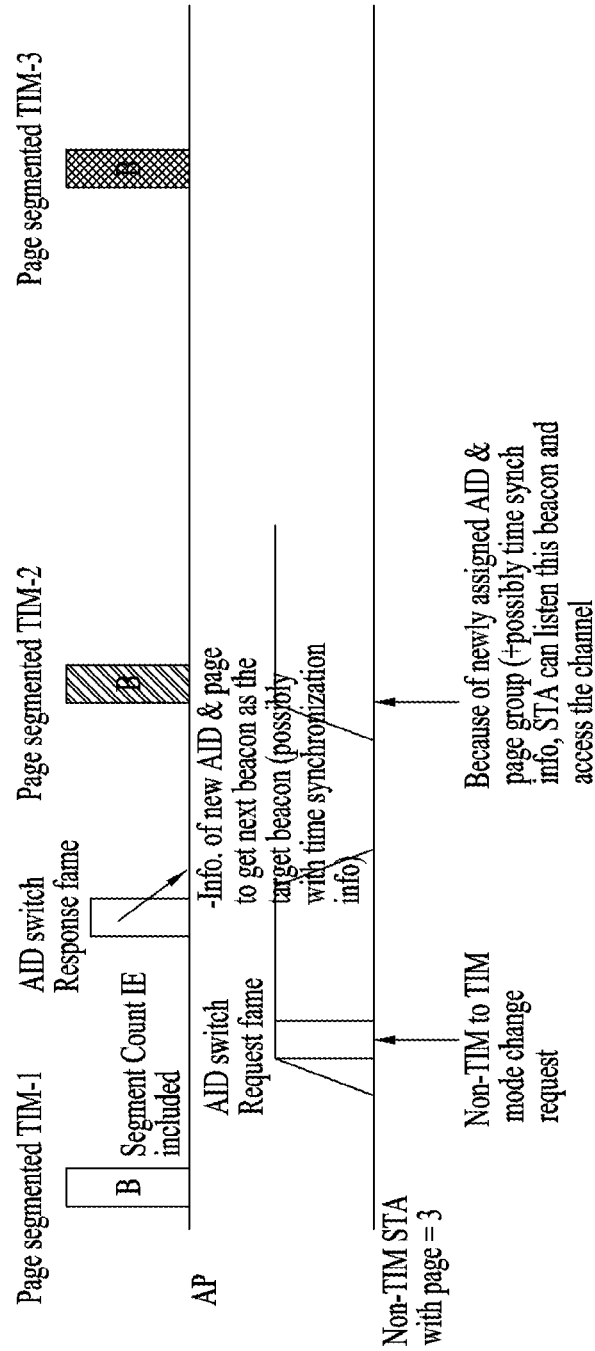
FIG. 22 illustrates a channel access method according to another embodiment of the present invention.

Referring to FIG. 22, an AID switch response frame transmitted from the AP to the STA may include information about a newly assigned AID and page information. Herein, the newly assigned AID is preferably allocated to a segmented TIM corresponding to a beacon reception time closest to the mode switch time.

According to the method proposed in this embodiment, when the STA switches from the non-TIM mode to the TIM mode, the STA may transmit mode switch request frame information to the AP, and receive, from the AP, response frame information in response to the mode switch request frame information. After receiving the response frame information, the STA switches to the sleep state. The STA may switch from the sleep state to the awake state based on the received response frame information, and listen to beacon frame information containing the next segmented TIM. The response frame information may include information created by reassigning association ID (AID) information and the paging information. Details are described below.

Once the STA receives, from the AP, an AID switch response frame containing a newly assigned AID, the STA does not switch to the sleep mode until a beacon is received. The STA recognizes desired information by receiving a beacon closest to the mode switch time. The desired information may include a current timestamp value and the information indicating the duration before the next the beacon.

The STA may perform channel access beginning with a segmented TIM (e.g., segmented TIM-2) closest to the mode switch time, without waiting for the segmented TIM to which the STA belongs based on the aforementioned information. Accordingly, the STA may perform time synchronization by receiving the closest segmented TIM and performing channel access. Thereby, the STA may receive the segmented TIM (segmented TIM-3) to which the STA belongs through time synchronization. In this case, the STA may switch to the sleep state and wait in this state after receiving the closest segmented TIM. Then, the STA may switch to the awake mode when the segmented TIM to which the STA belongs is received.

Hereinafter, description will be given of two cases of the proposed efficient channel access method implemented according to the time at which an STA switches from the non-TIM mode to the TIM mode. The two cases basically include the details of the example of FIG. 21.

Embodiment 3—Mode Switch at Time Close to Time to Listen to Next DTIM

Figure 23:
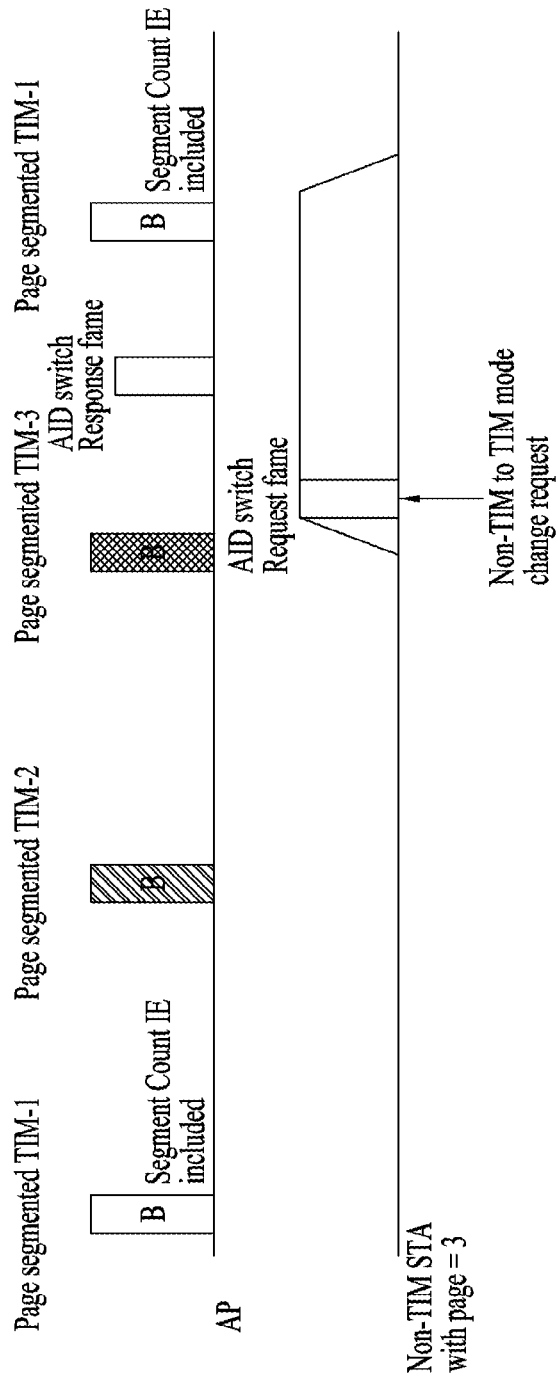
FIG. 23 illustrates a channel access method according to another embodiment of the present invention.

FIG. 23 illustrates channel access performed by an STA switching from the non-TIM mode to the TIM mode according to another embodiment of the present invention.

As shown in FIG. 23, a beacon containing a DTIM is broadcast, and the STA switches from the non-TIM mode to the TIM mode at a time around the time to receive a beacon containing the next DTIM after a time almost equal to the DTIM interval passes. In this case, the AP may transmit, to the STA, information indicating a duration extending up to the time for the next DTIM and a current timestamp value. Thereby, the STA may receive the next DTIM and acquire necessary information, namely information about the segmented TIM to which the STA belongs and the time to receive the segmented TIM.

Embodiment 4—Mode Switch Immediately after Time to Listen to DTIM

Figure 24:
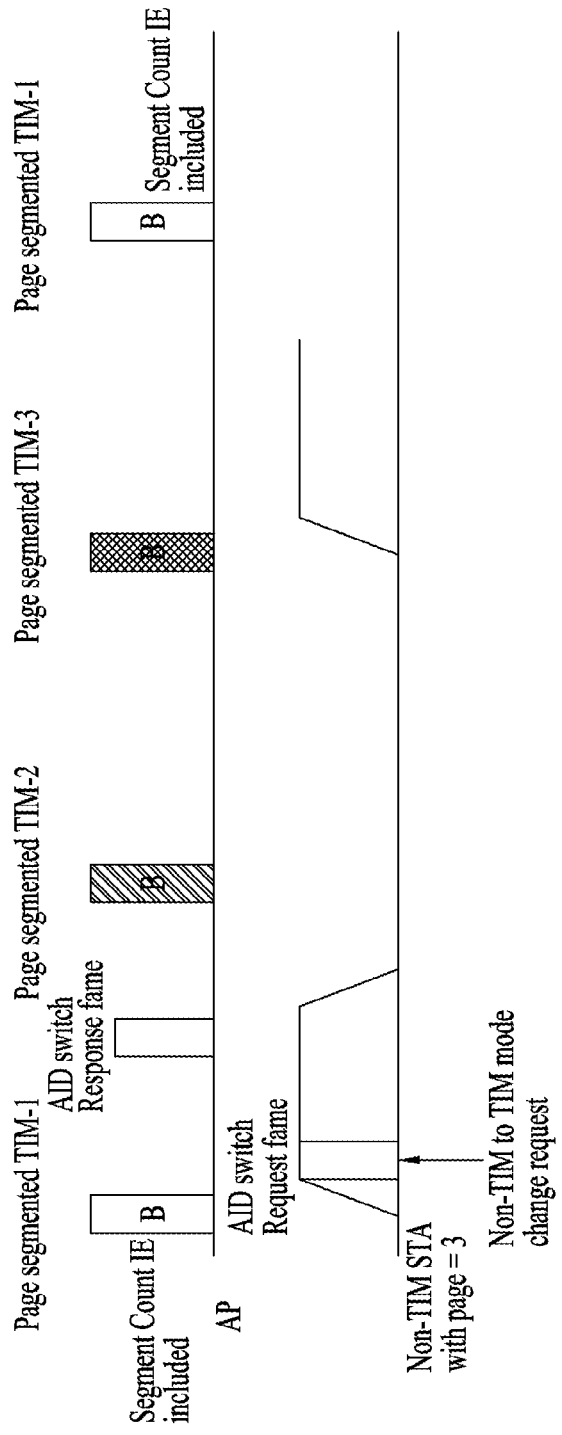
FIG. 24 illustrates a channel access method according to another embodiment of the present invention.

FIG. 24 illustrates channel access performed by an STA switching from the non-TIM mode to the TIM mode according to another embodiment of the present invention.

As shown in FIG. 24, an STA switches from the non-TIM mode to the TIM mode immediately after a beacon containing the DTIM is broadcast. In this case, the biggest problem is that the STA needs to wait for a time almost equal to the DTIM interval until the STA receives the next DTIM. Accordingly, continuously operating in the active mode until the STA receives the next DTIM may cause the STA (not connected to a regular power source) to consume power.

Therefore, if the AP transmits, to the STA, an AID switch response frame containing a segment count IE, the STA receiving the frame may achieve an effect similar to an effect achieved when the STA receives a DTIM. As if the STA received the segment count IE contained in the DTIM, the STA may recognize the segmented TIM to which the STA belongs and the time to receive the segmented TIM. After performing mode switch, the STA may wait in the sleep state and switch to the awake state to receive a beacon at the time the STA receives the segmented TIM to which the STA belongs, based on AID switch response frame information.

Figure 25:
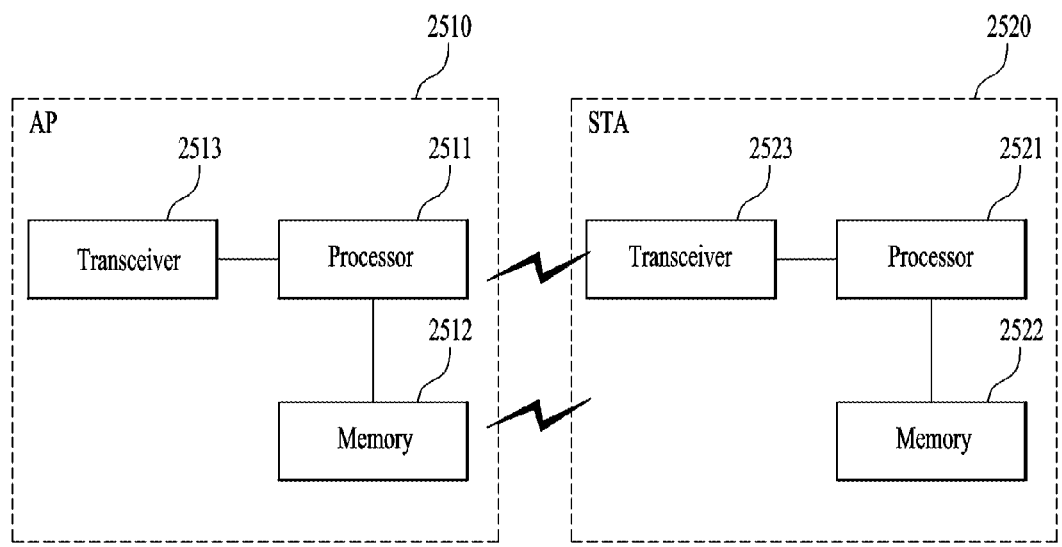
FIG. 25 is a block diagram illustrating a radio frequency apparatus according to an embodiment of the present invention.

FIG. 25 is a block diagram illustrating a radio frequency apparatus according to one embodiment of the present invention.

An AP 2510 may include a processor 2511, a memory 2512, and a transceiver 2513. An STA 2520 may include a processor 2521, a memory 2522, and a transceiver 2523. The transceivers 2513 and 2523 may transmit/receive a radio frequency signal and implement a physical layer according to an IEEE 802 system. The processors 2511 and 2521 may be connected to the transceivers 2513 and 2521 to implement a physical layer and/or a MAC layer according to an IEEE 802 system. The processors 2511 and 2521 may be configured to perform various operations according to the various embodiments of the present invention described above. In addition, modules to perform operations of an AP and an STA according to the various embodiments of the present invention described above may be stored in the memories 2512 and 2522 and executed by the processors 2511 and 2521. The memories 2512 and 2522 may be contained in the processors 2511 and 2521 or may be installed at the exterior of the processors 2511 and 2521 and connected to the processors 2511 and 2521 by a well-known means.

Constituents of the AP and the STA may be provided such that the various embodiments of the present invention described above are independently applied or two or more embodiments are simultaneously implemented. For clarity, redundant descriptions are omitted.

The embodiments of the present invention described above may be implemented by various means. For example, the embodiments of the present invention may be implemented by hardware, firmware, software, or a combination thereof.

When implemented by hardware, a method according to embodiments of the present invention may be implemented by one or more ASICs (application specific integrated circuits), DSPs (digital signal processors), DSPDs (digital signal processing devices), PLDs (programmable logic devices), FPGAs (field programmable gate arrays), processors, controllers, microcontrollers, microprocessors, and the like.

When implemented by firmware or software, a method according to the embodiments of the present invention may be implemented in the form of a module, a procedure, a function, or the like which performs the functions or operations described above. Software code may be stored in a memory unit and executed by the processor. The memory unit may be disposed inside or outside the processor to transceive data with the processor through various well-known means.

Detailed descriptions of preferred embodiments of the present invention have been given to allow those skilled in the art to implement and practice the present invention. Although descriptions have been given of the preferred embodiments of the present invention, it will be apparent to those skilled in the art that various modifications and variations can be made in the present invention without departing from the spirit and scope of the present invention. Thus, the present invention is not intended to be limited to the embodiments described herein, but is intended to have the widest scope consistent with the principles and novel features disclosed herein.

INDUSTRIAL APPLICABILITY

Various embodiments of the present invention have been described through examples applied to IEEE 802.11, but they may also be equally applied to various wireless access systems other than IEEE 802.11.

The invention claimed is:

1. A method for performing channel access to an access point (AP) by a station (STA) in a wireless local area network (WLAN), the method comprising:
   transmitting a mode switch request frame to the AP;
   receiving a response frame including reassigned association ID (AID) information and paging information from the AP for the mode switch request frame information and switching to a sleep state;
   switching from the sleep state to a wake-up state based on the received response frame; and
   listening to a beacon frame containing a next segmented traffic indication map (TIM) based on the AID information and paging information,
   wherein the AID information and paging information are assigned to a next segment TIM which is closest to the response frame.

2. The method according to claim 1, wherein the response frame further includes a current timestamp value and information indicating a duration extending up to a next beacon frame.

3. A station (STA) for performing channel access to an access point (AP) in a wireless local area network (WLAN), the STA comprising:
   a transceiver to transmit and receive a radio signal; and
   a processor configured to operate in functional connection with the transceiver,
   wherein the processor is configured to allow the STA to:
      transmit a mode switch request frame to the AP;
      receive a response frame including reassigned association ID (AID) information and paging information from the AP for the mode switch request frame information and switching to a sleep state;
      switch from the sleep state to a wake-up state based on the received response frame; and
      listen to a beacon frame containing a segmented traffic indication map (TIM) based on the AID information and paging information,
   wherein the AID information and paging information are assigned to a next segment TIM which is closest to the response frame.

* * * * *